(12) United States Patent
Farina

(10) Patent No.: US 12,502,491 B2
(45) Date of Patent: Dec. 23, 2025

(54) SYSTEMS AND METHODS FOR INHALER TESTING

(71) Applicant: Proveris Scientific Corporation, Hudson, MA (US)

(72) Inventor: Dino J. Farina, Sudbury, MA (US)

(73) Assignee: Proveris Scientific Corporation, Hudson, MA (US)

(*) Notice: Subject to any disclaimer, the term of this patent is extended or adjusted under 35 U.S.C. 154(b) by 408 days.

(21) Appl. No.: 18/300,004

(22) Filed: Apr. 13, 2023

(65) Prior Publication Data

US 2023/0321370 A1    Oct. 12, 2023

Related U.S. Application Data

(63) Continuation of application No. PCT/US2021/054990, filed on Oct. 14, 2021.

(60) Provisional application No. 63/092,244, filed on Oct. 15, 2020.

(51) Int. Cl.
*G01F 1/36*       (2006.01)
*A61M 15/00*      (2006.01)
*G01F 15/00*      (2006.01)

(52) U.S. Cl.
CPC .......... *A61M 15/0065* (2013.01); *G01F 1/36* (2013.01); *G01F 15/005* (2013.01); *A61M 2209/02* (2013.01)

(58) Field of Classification Search
CPC ................. G01F 1/36; G01F 15/005
USPC ....................................................... 73/118.01
See application file for complete search history.

(56) References Cited

U.S. PATENT DOCUMENTS

| | | |
|---|---|---|
| 2,779,233 A | 1/1957 | Dodge et al. |
| 3,275,744 A | 9/1966 | Dietrich |
| 4,004,550 A | 1/1977 | White et al. |
| 4,031,746 A | 6/1977 | Furuta et al. |
| 4,357,670 A | 11/1982 | McFarlane |
| 4,402,346 A | 9/1983 | Cheetham et al. |
| 4,415,265 A | 11/1983 | Campillo et al. |
| 4,614,300 A | 9/1986 | Falcoff et al. |
| 4,628,465 A | 12/1986 | Ito et al. |
| 4,965,841 A | 10/1990 | Kaneko et al. |
| 4,984,158 A | 1/1991 | Hillsman et al. |
| 4,992,952 A | 2/1991 | Sasaki et al. |
| 5,075,014 A | 12/1991 | Sullivan et al. |

(Continued)

FOREIGN PATENT DOCUMENTS

| | | |
|---|---|---|
| CA | 2667335 A1 | 5/2008 |
| CN | 1622838 A | 6/2005 |

(Continued)

OTHER PUBLICATIONS

Kinaromate Automated pMDI Collection System, www.proveris.com/kinaeromate-shake-mate-fire-system, Proveris Scientific. (Oct. 26, 2019).

(Continued)

*Primary Examiner* — Peter J Macchiarolo
*Assistant Examiner* — Rodney T Frank
(74) *Attorney, Agent, or Firm* — Wilson Sonsini Goodrich & Rosati

(57) ABSTRACT

The present disclosure provides a dose collection apparatus that comprises a first conduit comprising a first inlet port and a first fluid flow path and a second conduit comprising a second inlet port and a second fluid flow path.

20 Claims, 4 Drawing Sheets

(56) References Cited

U.S. PATENT DOCUMENTS

| | | |
|---|---|---|
| 5,277,074 A | 1/1994 | Poole et al. |
| 5,284,133 A | 2/1994 | Burns et al. |
| 5,337,926 A | 8/1994 | Drobish et al. |
| 5,356,049 A | 10/1994 | Harris et al. |
| 5,396,333 A | 3/1995 | Aleshin et al. |
| RE34,910 E | 4/1995 | Funkenbusch et al. |
| 5,435,171 A | 7/1995 | Chino et al. |
| 5,503,144 A | 4/1996 | Bacon |
| 5,561,527 A | 10/1996 | Krone-Schmidt et al. |
| 5,567,619 A | 10/1996 | Stone |
| 5,579,659 A | 12/1996 | Roberts et al. |
| 5,676,129 A | 10/1997 | Rocci, Jr. et al. |
| 5,785,048 A | 7/1998 | Koerner et al. |
| 5,879,713 A | 3/1999 | Roth et al. |
| 6,029,600 A | 2/2000 | Davis et al. |
| 6,049,382 A | 4/2000 | Lazaro Gomez |
| 6,148,815 A | 11/2000 | Wolf et al. |
| 6,149,071 A | 11/2000 | MacCallumMhor et al. |
| 6,193,936 B1 | 2/2001 | Gardner et al. |
| 6,202,642 B1 | 3/2001 | McKinnon et al. |
| 6,207,445 B1 | 3/2001 | Crosby |
| 6,256,597 B1 | 7/2001 | Wang et al. |
| 6,481,301 B2 | 11/2002 | Pawliszyn |
| 6,508,112 B1 | 1/2003 | Verhoeven et al. |
| 6,618,127 B2 | 9/2003 | Yang et al. |
| 6,651,651 B1 | 11/2003 | Bonney et al. |
| 6,665,421 B1 | 12/2003 | Farina et al. |
| 6,785,400 B1 | 8/2004 | Farina et al. |
| 6,799,090 B2 | 9/2004 | Farina et al. |
| 6,973,199 B2 | 12/2005 | Farina et al. |
| 7,013,202 B2 | 3/2006 | Farina et al. |
| 7,100,839 B2 | 9/2006 | Farina et al. |
| 7,126,166 B2 | 10/2006 | Nair et al. |
| 7,463,751 B2 | 12/2008 | Farina et al. |
| 7,490,782 B2 | 2/2009 | Farina et al. |
| 7,658,122 B2 | 2/2010 | Farina et al. |
| 7,672,478 B2 | 3/2010 | Farina et al. |
| 7,686,016 B2 | 3/2010 | Wharton et al. |
| 7,934,434 B2 | 5/2011 | Shelton et al. |
| 8,807,131 B1 | 8/2014 | Tunnell et al. |
| 9,360,400 B2 | 6/2016 | Farina et al. |
| 10,473,564 B2 | 11/2019 | Farina et al. |
| 11,079,305 B2 | 8/2021 | Farina et al. |
| 11,426,540 B2 | 8/2022 | Farina et al. |
| 11,904,088 B2 | 2/2024 | Farina et al. |
| 12,128,174 B1 | 10/2024 | Farina et al. |
| 2001/0032521 A1 | 10/2001 | Pawliszyn |
| 2002/0113136 A1 | 8/2002 | Talley et al. |
| 2004/0199296 A1 | 10/2004 | Farina et al. |
| 2004/0258278 A1 | 12/2004 | Farina et al. |
| 2004/0261792 A1 | 12/2004 | Wolf et al. |
| 2005/0001054 A1 | 1/2005 | Farina et al. |
| 2005/0016527 A1 | 1/2005 | Barger et al. |
| 2005/0065736 A1 | 3/2005 | Bauck et al. |
| 2005/0068528 A1 | 3/2005 | Altobelli et al. |
| 2005/0072421 A1* | 4/2005 | Suman ............... A61M 15/00 128/200.23 |
| 2005/0077369 A1 | 4/2005 | Farina et al. |
| 2005/0147565 A1 | 7/2005 | Sequeira et al. |
| 2006/0034504 A1 | 2/2006 | Farina et al. |
| 2006/0102808 A1 | 5/2006 | Farina et al. |
| 2006/0140873 A1 | 6/2006 | Chang |
| 2007/0119450 A1 | 5/2007 | Wharton et al. |
| 2007/0157931 A1 | 7/2007 | Parker et al. |
| 2008/0173067 A1* | 7/2008 | Farina ............... B05B 11/10 73/1.16 |
| 2008/0208081 A1 | 8/2008 | Murphy et al. |
| 2009/0139352 A1 | 6/2009 | Shelton et al. |
| 2009/0255535 A1 | 10/2009 | Kanzer |
| 2010/0083963 A1 | 4/2010 | Wharton et al. |
| 2010/0087749 A1 | 4/2010 | Tovey |
| 2010/0297635 A1 | 11/2010 | Olin et al. |
| 2012/0036943 A1 | 2/2012 | Lehmann |
| 2014/0008384 A1 | 1/2014 | Helmlinger |
| 2014/0102450 A1 | 4/2014 | Broborg et al. |
| 2014/0180156 A1 | 6/2014 | Ku et al. |
| 2015/0020804 A1 | 1/2015 | Van Der Mark et al. |
| 2015/0033824 A1* | 2/2015 | Hammarlund ....... G01N 33/497 73/23.3 |
| 2015/0157566 A1 | 6/2015 | Kim et al. |
| 2015/0286774 A1 | 10/2015 | Lohi et al. |
| 2015/0335834 A1 | 11/2015 | Anandhakrishnan |
| 2016/0022946 A1 | 1/2016 | Sislian et al. |
| 2016/0302484 A1* | 10/2016 | Gupta ............... G01N 15/0255 |
| 2018/0153441 A1 | 6/2018 | Quirke |
| 2018/0275022 A1 | 9/2018 | Price et al. |
| 2018/0338023 A1 | 11/2018 | DeBates et al. |
| 2019/0070372 A1 | 3/2019 | Farina et al. |
| 2019/0113418 A1 | 4/2019 | Eicher et al. |
| 2019/0224426 A1 | 7/2019 | Farina et al. |
| 2019/0261891 A1 | 8/2019 | Ahmad et al. |
| 2020/0245899 A1 | 8/2020 | Heanue et al. |

FOREIGN PATENT DOCUMENTS

| | | |
|---|---|---|
| CN | 101547717 A | 9/2009 |
| CN | 108697868 A | 10/2018 |
| EP | 3336543 A1 | 6/2018 |
| JP | S5263750 A | 5/1977 |
| JP | H1133015 A | 2/1999 |
| JP | 2001017889 A | 1/2001 |
| JP | 2002519649 A | 7/2002 |
| JP | 2004069494 A | 3/2004 |
| JP | 2004528150 A | 9/2004 |
| JP | 2006266718 A | 10/2006 |
| JP | 2007506483 A | 3/2007 |
| JP | 4118325 B2 | 7/2008 |
| KR | 20200077639 A | 7/2020 |
| WO | WO-9207600 A1 | 5/1992 |
| WO | WO-1994021989 A1 | 9/1994 |
| WO | WO-0113092 A1 | 2/2001 |
| WO | WO-0113322 A1 | 2/2001 |
| WO | WO-02100468 A2 | 12/2002 |
| WO | WO-03000429 A2 | 1/2003 |
| WO | WO-02100468 A3 | 5/2003 |
| WO | WO-2004011069 A1 | 2/2004 |
| WO | WO-2004091806 A1 | 10/2004 |
| WO | WO-2008060484 A2 | 5/2008 |
| WO | WO-2010107895 A2 | 9/2010 |
| WO | WO-2012120140 A1 | 9/2012 |
| WO | WO-2016004103 A1 | 1/2016 |
| WO | WO-2017058772 A1 | 4/2017 |
| WO | WO-2017/156287 | 9/2017 |
| WO | WO-2017156287 A1 | 9/2017 |
| WO | WO-2017205824 A1 | 11/2017 |
| WO | WO-2019204568 A1 | 10/2019 |
| WO | WO-2021202306 A1 | 10/2021 |
| WO | WO-2022081847 A1 | 4/2022 |
| WO | WO-2022221198 A1 | 10/2022 |

OTHER PUBLICATIONS

Jan. 4, 2019 Restriction Requirement for U.S. Appl. No. 15/388,797.

Apter, et al., Testing the reliability of old and new features of a new electronic monitor for metered dose inhalers; Annals of Allergy, Asthma, & Immunology, Apr. 2001, 421-424.

Asthma Facts, Center for Disease Control, Jul. 2013, pp. 1-15.

Asthma's Impact on the Nation, Center for Disease Control, pp. 1-4.

Balderin, Amira M. Real-time analysis of fuel spray images, IEEE International Conference on Acoustics, Speech, and Signal Processing, Apr. 6-9, 1987, DOI: 10.1109/ICASSP.1987.1169740 pp. 624-624.

Bennett, J. S., An investigation of particle size measurement using non-intrusive optical techniques in a gas turbine combustor, M.S. Thesis Naval Postgraduate School, Monterey, CA, 1 pg. (abstract) (Sep. 1985).

Chow et al., Statistics in drug research: methodologies and recent developments, Marcel Decker, 2002 pp. 128-133.

Constant, M. A practical method for characterizing poured beer foam quality, The American Society of Brewing Chemists, Inc. 50(2):37-47(1992).

(56) References Cited

OTHER PUBLICATIONS

Cooper, A QbD Method Development Approach for a Generic pMDI, Pharmaceutical Technology, 40.5, 30-36, 63.
Copley Scientific. Quality Solutions for Inhaler Testing. 2007; pp. 12-18 & 20; Retrieved Aug. 31, 2015, Available at: URL:https://www.copleyscientific.com.
Cost of COPD, Propeller Health, 2014, pp. 2-10.
Deljouravesh, R., An Optical Patternator for Quantitative and On-Line Spray Diagnostics, thesis submitted to the Department of Mechanical Engineering, Queen's University, Kingston, Ontario, Canada, 86 pp. (Oct. 1997).
Dhand, R et al., High Speed Photographic Analysis of Aerosols Produced by Metered Dose Inhalers, J. Pharm Pharmacol., vol. 40,5 pgs. (abstract only) (1988).
Doub, Metered Dose Inhalers (MDIs) In Vitro Measures to Confirm Patient Perceptions: HFA vs. CFC, FDA: Bringing value to the Patent in a Changing World, Mar. 29, 2011, 1-16.
Dunbar, C.A., et al., An Experimental Investigation of the Spray Issued from a pMDI Using Laser Diagnostic Techniques, Journal of Aerosol Medicine, 10(4 ), 1 pg. (abstract) , (1997).
EP15814981.5 Extended Search Report dated Apr. 17, 2018.
Everard et al. Factors Affecting Total and "Respirable" Dose Delivered by A Salbutamol Metered Dose Inhaler, Thorax 50 (1995): 746-749-455.
Ex Parte Quayle Action dated Dec. 10, 2015 for U.S. Appl. No. 14/788,324.
Extended European Search report dated Oct. 14, 2019 for EP Appl. No. 17764110.7.
Farina, et al. A Shaking Control Space Study for a Fluticasone/Salmeterol Metered Dose Inhaler Based on Spray Pattern Analysis. Proveris Scientific Corporation, 2013.
Feikema, D. A., Optical measurements in rocket engine liquid sprays, In Alabama Univ., Research Reports: 1994 NASA/ASEE Summer Faculty Fellowship Program 6p (SEE N95-18967 05-80), 1 pg. (abstract) (Oct. 1994).
Ferreira et al. Box-Behnken Design an Alternative for the Optimization of Analytical Methods. Analytica Chimica Acta 597 (2007): 179-186.
Fink et al. Problems with Inhaler Use: A Call for Improved Clinician and Patient Education, Respiratory Care, 50.10 (Sep. 2005): 1360-1375.
Giraud et al. Misuse of corticosteroid metered-dose inhaler is associated with decreased asthma stability, European Respiratory Journal, (2002): 246-251.
Guidance for Industry. Nasal Spray and Inhalation Solution, Suspension, and Spray Drug Products—Chemistry, Manufacturing, and Controls Documentation. US Department of Health and Human Services. CDER. Jul. 2002. 49 pages.
Hess, Dean R. Ph.D., RRT, FAARC, Aerosol Delivery Devices in the Treatment of Asthma, Respiratory Care, Jun. 2008, vol. 53, No. 6, pp. 699-725.
Ibrahim, et al. Inhalation drug delivery devices: Technology Update, Med Devices Auckland 8 (2015): 131-139.
International Search report dated Oct. 6, 2015 for International Application No. PCT/US2015/038658.
Kelly, Shake Well Before Dispensing, PharmaD, Pharmacy Times, Sep. 28, 2015, 1-3.
Locke, R. J., et al., Non-Intrusive Laser-Induced Imaging for Speciation and Patternation in High Pressure Gas Turbine Combustors, GLTRS, 2 pp (1999).
Locke, R. J., et al., Nonintrusive Laser-Induced Imaging for Speciation and Patternation in High-Pressure Gas Turbine Combustors, Proc. SPIE. vol. 3783, 12 pgs. (1999).
Locke, R. J., et al., Updates on Optical Diagnosis of Fuel Spray Patterns, 2 pp. (1999). http://www.nasatech.com/Briefs/DEC99/LEW16882.html. Non-Intrusive Laser-Induced Imaging for Speciation and Patternation in High Pressure Gas Turbine Combustors, prepared for the Optical Diagnostics for Fluids, Heat, Combustions, and Phtoomechanics of Solids sponsored by the International Society for Optical Engineering, Denver, Colorado, 9 pp. (Jul. 18-23, 1999).
Lopera et al., Improved entropic edge-detection. Proceedings- International Conference on Image Analysis and Processing, ICIAP 1999. 180 -184. 10.1109/ICIAP.1999.797591.
McEvoy, Mike, Alburterol (Ventolin): Drug Whys, EMSL.com.
Minnich, M. G., et al., Spatial Aerosol Characteristics of a Direct Injection High Efficiency Nebulizer Via Optical Patternation, Spectrochmica Acta Part B, vol. 56, 2 pgs (abstract) , (2001).
Mitchell et al.: Developing Ways to Evaluate in the Laboratory How Inhalation Devices Will Be Used by Patients and Care-Givers: The Need for Clinically Appropriate Testing. AAPS PharmSciTech 15:1275-1291 (2014).
Myrdal et al. Advances in Metered Dose Inhaler Technology: Formulation Development. AAPS Pharma Sci Tech., 15.2 (Apr. 2014): 434-44.
Al-Jahdali, et al., Improper inhaler technique is associated with poor asthma control and more frequent emergency department visits, Asthma & Clinical Immunology 2013, 9:8.
Newcomb, et al. How critical quality attributes and process variables drive the in-vitro performance of pMDIs: new technologies and methods; Proveris Scientific Corporation, 2015.
Newcomb et al., Understanding the importance and effects of shaking on pMDI performance, Proveris Scientific Corporation, DDL Poster, 2015.
Newman, Principles of Metered-Dose Inhaler Design; Respiratory Care, Sep. 50.9 (2005): 1177-1190.
Nicolini., Beclomethasone/Formoterol fixed combination for the management of asthma: patient considerations. Ther Clin Risk Manag, 4.5 (2008): 855-864.
Non-Final Office Action dated Aug. 2, 2019 for U.S. Appl. No. 15/388,797.
Non-Final Office Action dated Apr. 3, 2020 for U.S. Appl. No. 16/123,937.
Notice of Allowance dated Feb. 10, 2016 for U.S. Appl. No. 14/788,324.
Notice of Allowance dated Sep. 11, 2019 for U.S. Appl. No. 15/388,797.
Pastor, J. V., et al., Analysis Methodology of Diesel Spray and Flame by Means of In-Cylinder Endoscopic Imaging, (The Institution of Electrical Engineers). Savoy Place, London: IEE, 1 pg. (abstract), (2000).
PCT/US17/21599 International Search Report with Written Opinion, Jun. 1, 2017.
PCT/US2021/054990 International Search Report and Written Opinion dated Jan. 4, 2022.
Pitluk et al., A Shaking Control Space for Fluticasone Propionate Nasal Spray DCU Testing. Proveris Scientific Corporation, 2012.
Sassi, G., et al., Vision system for combustion and diagnosis in gas turbines, Proc. SPIE vol. 2506, Air Pollution and Visibility Measurements, Fabian, P., et al., Eds., 1 pg. (abstract) (Sep. 1995).
Saxena, Study: Patients don't know how to use drug delivery devices. www.fiercedrugdelivery.com, Dec. 17, 2014, 1-2.
Scichilone, et al. Patient perspectives in the management of asthma: improving patient outcomes through critical selection of treatment options, Patent Preference and Adherence, 4 (2010): 17-23.
Settles, G.S., A Flow Visualization Study of Airless Spray Painting, Proceedings of the 10th Annual conference on Liquid Atomization and Spray Systems, ILASS-Americas '07, May 18-21, 1997, Ottawa, Canada, pp. 145-149.
Terzano, Pressurized metered Dose Inhalers and Add-on Devices, Pulmonary Pharmacology & Therapeutics, 14 (2001): 351-366.
The Fifth Conference of ILASS-ASIA Figs. 1-11, 4 pp.
Ullom, M. J and Sojka, P. E., A Simple Optical Patternator for Evaluating Spray Symmetry, Review of Scientific Instruments, 72(5), 1 pg. (abstract), (2001).
Virchow et al. A review of the value of innovation in inhalers for COPD and asthma, Journal of Market Access & Health Policy, Sep. 2015.
Weinstein, C. L. J., et al., Development of an Automated Digital Spray Pattern Measurement System, Respiratory Drug Delivery, VIII:581-583 (2002).

(56) References Cited

OTHER PUBLICATIONS

Accessories: Stands for Use with Vereo© Actuators., Proveris Scientific,—May 13, 2020 4 pages (2020). Retrieved from the Internet URL:https://web.archive.org/web/20200513170414/https://www.proveris.com/actuator-stands-and-other-items.

Astech Projects supplies shot weight workstation to test dry powder inhalers. Astech Projects. Manufacturing Chemist. Drug Delivery. Nov. 4, 2016. 5 pages (2016). Available at: https://web.archive.org/web/20200915000000/https://www.manufacturingchemist.com/news/article_page/Astech_Projects_supplies_shot_weight_workstation_to_test_dry_powder_inhalers/122616.

Aumiller, W. et al. Time correlation of plume geometry and laser light scattering droplet size data. Respiratory Drug Delivery 8:497-499 (2002).

Badreldin, Amira M. Real-time analysis of fuel spray images. ICASSP '87. IEEE International Conference on Acoustics, Speech, and Signal Processing. 12:622-624 (1987).

Beebe, Danielle. Innovative Device Contains Exhaled Virus Particles. UNMC Department of Anesthesiology:1-5 (2020).

Berg, T. et al. Spray Imaging Systems for Quantitative Spray Analysis, ILASS-Europe, 6 pages (2001).

Chauhan, Heli et al., Reducing variability in test results for OINDPS with automated actuation. Pulmonary & Nasal Delivery. Ondrugdelivery Magazine. 92: 52-57 (2018).

Chung, I. P. et al. Characterization of a Spray from an Ultrasonically Modulated Nozzle, Atomization and Sprays Journal of the International Institutes for Liquid Atomization and Spray Systems 7:2 (1997).

Clarke, Peter. Five-Minute Breath Test For Covid-19. IMEC:1-2 (2020).

Cohen, J. M. and Rosfjord, T. J. Spray patternation at high pres-sure, American Institute of Aeronautics and Astronautics, Inc., p. 1 (1989).

Copley: Driving Results in Inhaler Testing. Copley Brochure, 2020 Edition. 150 pages (2020).

Copley Scientific to display new equipment for consistent MDI testing at DDL27. Manufacturing Chemist.Drug Delivery. Dec. 2, 2016. 6 pages (2016). Available at https://web.archive.org/web/20200727212243/https://manufacturingchemist.com/news/article_page/Copley_Scientific_to_display_new_equipment_for_consistent_MDI_testing_at_DDL27/123472.

COVID-19 Specimen Collection Guidelines. Quest Specimen Requirements And Acceptable Supplies for SARS-COV-2 RNA (COVID-19), Qualitative NAAT (Test code 39448). Quest Diagnostics:1-11 (2020).

Cummings, R. H., et al., Comparison of Spray Pattern, Plume Geometry and Droplet Sizing by Light-Scattering for Characterization of Nasal Inhalers, Respiratory Drug Delivery V, 1996 Magellan Laboratories, Inc., pp. 320-322.

Dhand, R. et al. High speed photographic analysis of aerosols produced by metered dose inhalers. Journal of pharmacy and pharmacology 40(6):429-430 (1988).

Dolovich, M. Measurement of particle size characteristics of metered dose inhaler (MDI) aerosols. Journal of aerosol medicine 4(3):251-263 (1991).

Dunbar, Craig A. An experimental investigation of the spray issued from a pMDI using laser diagnostic techniques. Journal of aerosol medicine 10(4):351-368 (1997).

Dvorak, P. How to See Aerosol Spray Patterns and Plumes. Machine Design 72(13): 122(2000).

Eck, C. R., et al., Plume Geometry and Particle Size Measurements as a Product Development Tool, Respiratory Drug Delivery VI:291-295 (1998).

Final Office Action dated Aug. 16, 2019 for U.S. Appl. No. 16/123,937.

Guidance for Industry Bioavailability and Bioequivalence Studies for Nasal Aerosols and Nasal Sprays for Local Action (Draft Guid-ance), FDA, pp. 1-36, Jun. 1999.

Guidance for Industry—Metered Dose Inhaler (MDI) and Dry Pow-der Inhaler (DPI) Drug Product (Draft Guidance), FDA, pp. 1-62, Oct. 1998.

Guidance for Industry—Nasal Spray and Inhalation Solution, Suspension, and Spray Drug Products (Draft Guidance), FDA, pp. 1-43, May 1999.

Hatagishi, Etsuko et al. Establishment And Clinical Applications Of A Portable System For Capturing Influenza Viruses Released Through Coughing. PLoS One 9(8):e103560, 1-11 (2014).

Hicks Yolanda R. et al., Updates on Optical Diagnosis of Fuel Spray Patterns. NASA Tech Briefs. 2 pages (1999).

Ladhani, Laila et al. Electrostatic Sampling of Patient Breath for Pathogen Detection: A Pilot Study. Frontiers in Mechanical Engineering 6:40, 1-7 (2020).

Leung, Wallace Woon Fong, and Qiangqiang Sun. Electrostatic Charged Nanofiber Filter For Filtering Airborne Novel Coronavirus (COVID-19) And Nano-Aerosols. Separation and Purification Technology 250:116886, 1-17 (2020).

Locke R. J. and Hicks, Y.R. Fuel Injector Patternation Evaluation in Advanced Liquid-Fueled, High-Pressure, Gas Turbine Combustors, Using Nonintrusive Optical Diagnostic Techniques. NASA/TM-1998-206292, NASA Center for Aerospace Information. pp. 1-11 (1998).

Locke R. J. et al., Optical Diagnosis of Fuel Spray Patterns. Photonics Tech Briefs supplement to NASA Tech Briefs 23(3):18a (1999).

Miszuk, S. et al. Video characterization of flume patterns of inhalation aerosols. Journal of pharmaceutical sciences 69(6):713-717 (1980).

New Groundbreaking COVID-19 Test to Identify SARS-COV-2 Virus Particles in Exhaled Breath Within Five Minutes. HospiMedica International Staff Writers:1-5 (2020).

Pastor, Jose V. et al. Analysis methodology of diesel spray and flame by means of in-cylinder endoscopic imaging:13, 1-4 (2000).

PCT/US2010/027635 International Search Report and Written Opinion dated Nov. 19, 2010.

PCT/US2022/024268 International Search Report and Written Opinion dated Jul. 7, 2022.

Procedure No. TEB-APR-STP-0003; Determination of Exhalation Resistance Test, Air-Purifying Respirators Standard Test Procedure (STP). National Institute for Occupational Health & Safety (NIOSH) Standard Respirator Testing Procedures:1-6 (2023).

Rothstein, Jonathan. UMass College Of Engineering Researcher On Team Developing Covid-19 'Breathalyzer'. University of Massachusetts Amherst:1-3 (2020).

Sellens, Rick and Deljouravesh, Rama. Non-Orthogonal Optical Spray Pattern Analysis. $11^{th}$ Annual ICLASS 1998. 454-457 (1998).

Shin, Younggy. Visualization of liquid fuel behavior in a spark ignition engine during starting and warm-up. KSME International Journal 11(5):582-593 (1997).

SprayVIEW NSx User's Guide. Image Therm Engineering. 72 pages (2003).

Stadnytskyi, Valentyn et al. The Airborne Lifetime Of Small Speech Droplets And Their Potential Importance In SARS-COV-2 Transmission. Proceedings of the National Academy of Sciences of the United States of America 117(22):11875-11877 (2020).

U.S. Appl. No. 09/640,246 Office Action dated Jun. 4, 2003.
U.S. Appl. No. 10/666,916 Office Action dated Nov. 1, 2004.
U.S. Appl. No. 10/825,082 Office Action dated May 26, 2009.
U.S. Appl. No. 10/825,082 Office Action dated Nov. 25, 2008.
U.S. Appl. No. 10/895,745 Office Action dated May 10, 2007.
U.S. Appl. No. 11/250,854 Office Action dated Jan. 19, 2006.
U.S. Appl. No. 11/983,806 Office Action dated Aug. 24, 2009.
U.S. Appl. No. 12/291,492 Office Action dated May 6, 2009.
U.S. Appl. No. 12/686,705 Office Action dated May 9, 2011.
U.S. Appl. No. 12/725,749 Office Action dated Feb. 1, 2013.
Van Der Wijngaart, Wouter. et al. Detection of Airborne Viruses. KTH Royal Institute of Technology:1-4 (2018).

* cited by examiner

SYSTEMS AND METHODS FOR INHALER TESTING

CROSS-REFERENCE

This application is a continuation of International Patent Application No. PCT/US2021/054990, filed Oct. 14, 2021, which claims the benefit of U.S. Provisional Application No. 63/092,244, filed Oct. 15, 2020, each of which is incorporated herein by reference in its entirety.

BACKGROUND

Developers of drug delivery devices that deliver drug formulations by means of a dry powder or an aerosol spray, such as pressurized metered dose inhalers (pMDIs), metered dose inhalers (MDIs), dry powder inhaler (DPIs), or a nasal spray, can perform tests on such drug delivery devices to ensure that proper doses of the drug are delivered when patients actuate the drug delivery device. Traditional systems and manual methods for collecting aerosol spray particles that are emitted when a drug delivery device is actuated can be inefficient and can introduce significant variability, in turn compromising the integrity of the data collected per dose. Traditional systems and methods may also be limited to testing drug delivery devices using a single or shared conduit, which is inefficient and can add significant time to the overall process, reducing throughput. In addition, traditional testing setups show limited flexibility, requiring custom fixtures and modifications to be made in order to accommodate a wide variety of drug delivery devices, each potentially requiring different test setups and/or different sets of testing parameters. Therefore, novel testing systems are needed.

SUMMARY

The present disclosure addresses at least the abovementioned shortcomings of conventional testing systems. In an aspect, the present disclosure provides an apparatus for testing the amount and uniformity of a delivered dose of a drug. The apparatus may comprise a plurality of conduits to enhance the integrity, flexibility, and accuracy of testing for drug delivery devices using a plurality of test setups and a plurality of different testing parameters. The apparatus may enable developers of drug delivery devices to quickly and efficiently test drug delivery devices using a plurality of different dose collector modules and/or a plurality of different testing parameters in an automated fashion.

In one aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose. In some cases, the first dose collector module is a dose unit sampling apparatus (DUSA). In some cases, the first dose collector module comprises a low resistance filter configured to capture the dose provided by the inhaler. In some cases, the low resistance filter is configured to retain aerosolized particles with a particle size ranging from about 0.1 micrometers ($\mu m$) to about 10 $\mu m$. In some cases, the low resistance filter has a flow resistance of about 150 Pascals at a flow rate of about 90 liters of air per minute. In some cases, the first dose collector module is a cascade impactor. In some cases, the first dose collector module is an optical spray or an aerosol analyzer. In some cases, the second dose collector module is a waste collector. In some cases, the first inlet port is located at one end of the first conduit, and wherein the first dose collector module is located at the opposite end of the first conduit. In some cases, the second inlet port is located at one end of the second conduit, and wherein the second dose collector module is located at the opposite end of the second conduit. In some cases, the apparatus comprises a manifold that is configured to converge the first conduit and the second conduit into an outlet conduit, wherein the outlet conduit comprises an outlet port that is in fluid communication with a vacuum source. In some cases, at most one of the first conduit and the second conduit is operational at a given time instance. In some cases, the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation. In some cases, the breathing simulator is configured to induce the flow through at most one of the first conduit and the second conduit at a given time instance. In some cases, the breathing simulator is configured to generate a user programmable output trigger signal. In some cases, the output trigger signal is programmed to trigger at a user specified time that is within a time period required for the breathing simulator to execute a breathing profile. In some cases, the actuator is configured to (i) shake the inhaler and/or (ii) actuate the inhaler to provide the dose to at least one of the first conduit and the second conduit. In some cases, the actuator is configured to receive the output trigger signal described in any of the preceding. In some cases, the actuator is configured to actuate the device upon receipt of the output trigger signal described in any of the preceding. In some cases, the first conduit comprises a pressure sensor. In some cases, the pressure sensor is a differential pressure sensor. In some cases, the first conduit comprises a flow regulation valve that is configured to regulate the flow rate of a fluid through the first conduit. In some cases, the apparatus comprises a plurality of flow regulation valves that are configured to independently control or regulate flow through each of a plurality of conduits, wherein the plurality of conduits comprises at least the first conduit and the second conduit. In some cases, the first conduit comprises a pressure sensor and a flow regulation valve that is configured to regulate the flow rate of a fluid through the first conduit. In some cases, the apparatus further comprises an electric motor that is operatively coupled to the flow regulation valve, wherein the electric motor is configured to control the flow regulation valve. In some cases, the flow regulation valve comprises a control valve, a gate valve, a check valve, a ball valve, a globe valve, a butterfly valve, a diaphragm valve, a needle valve, a pinch valve, a proportional valve, or a stepping motor valve. In some cases, the apparatus further comprises an electric motor that is operatively coupled to the flow regulation valve, wherein the electric motor is configured to control the flow regulation valve based on at least one measurement obtained from the pressure sensor. In some cases, the pressure sensor comprises a differential pressure sensor, and wherein the at least one measurement comprises a real time flow rate measurement through the first conduit.

In some cases, the flow regulation valve comprises a triple offset butterfly valve or a proportional valve. In some cases, the apparatus further comprises a controller that is configured to provide at least one command to the electric motor to incrementally open and close the flow regulation valve to a predetermined position or orientation. In some cases, the at least one command is generated in part based on (i) a user input corresponding to a desired pressure drop across the first conduit and (ii) the one or more measurements obtained from the first pressure sensor. In some cases, the second conduit comprises a pressure sensor. In some cases, the pressure sensor is a differential pressure sensor. In some cases, the second conduit comprises a flow regulation valve that is configured to regulate the flow rate of a fluid through the second conduit. In some cases, the second conduit comprises a pressure sensor and a flow regulation valve that is configured to regulate the flow rate of a fluid through the second conduit. In some cases, the apparatus further comprises an electric motor that is operatively coupled to the flow regulation valve, wherein the electric motor is configured to control the flow regulation valve. In some cases, the apparatus further comprises an electric motor that is operatively coupled to the flow regulation valve, wherein the electric motor is configured to control the flow regulation valve based on at least one measurement obtained from the pressure sensor. In some cases, the pressure sensor comprises a differential pressure sensor, and wherein the at least one measurement comprises a real time flow rate measurement through the second conduit. In some cases, the flow regulation valve comprises a triple offset butterfly valve or a proportional valve. In some cases, the apparatus further comprises a controller that is configured to provide at least one command to the electric motor to incrementally open and close the flow regulation valve to a predetermined position or orientation. In some cases, the at least one command is generated in part based on (i) a user input corresponding to a desired pressure drop across the first conduit and (ii) the one or more measurements obtained from the first pressure sensor. In some cases, the apparatus further comprises a controller. In some cases, the apparatus further comprises a mating plane sensor configured to obtain positioning information for the movable platform, wherein the positioning information corresponds to a position or an orientation of the movable platform or the inhaler relative to the first input port or the second input port. In some cases, the mating plane sensor is configured to detect a position of the first input port or the second input port relative to the movable platform. In some cases, the mating plane sensor is configured to detect when the inhaler is aligned with the first input port or the second input port. In some cases, the mating plane sensor is configured to detect an offset between a position or an orientation of the inhaler and a position or an orientation of the first input port or the second input port. In some cases, the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port. In some cases, the apparatus further comprises a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port. In some cases, the first inlet port and the second inlet port comprise a mating ring that is configured to releasably couple to the inhaler to create a seal. In some cases, the inhaler comprises a mating ring that is fitted to a portion of the inhaler. In some cases, the mating ring is configured to create a seal between the inhaler and the first inlet port or the second inlet port when the inhaler is positioned adjacent to the first inlet port or the second inlet port. In some cases, the mating ring comprises a soft silicone rubber or a soft compliant material that is configured to create a reliable seal between the inhaler and the first inlet port or the second inlet port. In some cases, at least one or both of the first conduit or the second conduit comprises at least one, two, or three of a laminar flow conditioner, a flow tube, or a flow verifier. In some cases, the apparatus further comprises a third conduit comprising a third inlet port and a third fluid flow path, wherein the third fluid flow path is in fluid communication with the third inlet port. In some cases, the movable platform is configured to mate the inhaler to at least one of the first inlet port, the second inlet port, or the third inlet port in response to a user input corresponding to a selection of a desired input port. In some cases, the flow verifier is configured to obtain one or more measurements corresponding to a flow rate or a mass flow rate through the first conduit or the second conduit. In some cases, the flow verifier is configured to provide the one or more measurements to a mass flow controller that is configured to adjust an operation of the breathing simulator.

In another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the first dose collector module comprises a low resistance filter configured to capture the dose provided by the inhaler.

In another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the first dose collector module is an optical spray or an aerosol analyzer.

In yet another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the apparatus comprises a manifold that is configured to converge the first conduit and the second conduit into an outlet conduit, wherein the outlet conduit comprises an outlet port that is in fluid communication with a vacuum source.

In yet another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the first conduit and/or second conduit comprises a pressure sensor.

In yet another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the apparatus comprises a plurality of flow regulation valves that are configured to independently control or regulate flow through each of a plurality of conduits, wherein the plurality of conduits comprises at least the first conduit and the second conduit.

In yet another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; (d) an actuator configured to operate the inhaler to provide a dose to at least one of the first conduit or the second conduit, wherein the dose comprises a sample dose or a waste dose; and (e) a mating plane sensor configured to obtain positioning information for the movable platform, wherein the positioning information corresponds to a position or an orientation of the movable platform or the inhaler relative to the first input port or the second input port.

In yet another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein at least one or both of the first conduit or the second conduit comprises at least one, two, or three of a laminar flow conditioner, a flow tube, or a flow verifier.

In some cases, in any of the preceding, the first dose collector module is a dose unit sampling apparatus (DUSA). In some cases, in any of the preceding, the first dose collector module comprises a low resistance filter configured to capture the dose provided by the inhaler. In some cases, in any of the preceding, the low resistance filter is configured to retain aerosolized particles with a particle size ranging from about 0.1 micrometers (μm) to about 10 μm. In some cases, in any of the preceding, the low resistance filter has a flow resistance of about 150 Pascals at a flow rate of about 90 liters of air per minute. In some cases, in any of the preceding, the first dose collector module is a cascade impactor. In some cases, in any of the preceding, the first dose collector module is an optical spray or an aerosol analyzer. In some cases, in any of the preceding, the second dose collector module is a waste collector. In some cases, in any of the preceding, the first inlet port is located at one end of the first conduit, and wherein the first dose collector module is located at the opposite end of the first conduit. In some cases, in any of the preceding, the second inlet port is located at one end of the second conduit, and wherein the second dose collector module is located at the opposite end of the second conduit. In some cases, in any of the preceding, the apparatus comprises a manifold that is configured to converge the first conduit and the second conduit into an outlet conduit, wherein the outlet conduit comprises an outlet port that is in fluid communication with a vacuum source. In some cases, in any of the preceding, at most one of the first conduit and the second conduit is operational at a given time instance. In some cases, in any of the preceding, the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation. In some cases, in any of the preceding, the breathing simulator is configured to induce the flow through at most one of the first conduit and the second conduit at a given time instance. In some cases, in any of the preceding, the breathing simulator is configured to generate a user programmable output trigger signal. In some cases, in any of the preceding, the output trigger signal is programmed to trigger at a user specified time that is within a time period required for the breathing simulator to execute a breathing profile. In some cases, in any of the preceding, the actuator is configured to (i) shake the inhaler and/or (ii) actuate the inhaler to provide the dose to at least one of the first conduit and the second conduit. In some cases, in any of the preceding, the actuator is configured to receive the output trigger signal described in any of the preceding. In some cases, in any of the preceding, the actuator is configured to actuate the device upon receipt of the output trigger signal described in any of the preceding. In some cases, in any of the preceding, the first conduit comprises a pressure sensor. In some cases, in any of the preceding, the pressure sensor is a differential pressure sensor. In some cases, in any of the preceding, the first conduit comprises a flow regulation valve that is configured to regulate the flow rate of a fluid through the first conduit. In some cases, in any of the preceding, the apparatus comprises a plurality of flow regulation valves that are configured to independently control or regulate flow through each of a plurality of conduits, wherein the plurality of conduits comprises at least the first conduit and the second conduit. In some cases, in any of the preceding, the first conduit comprises a pressure sensor and a flow regulation valve that is configured to regulate the flow rate of a fluid through the first conduit. In some cases, in any of the preceding, the apparatus further comprises an electric motor that is operatively coupled to the flow regulation valve, wherein the electric motor is configured to control the flow regulation valve. In some cases, in any of the preceding, the flow regulation valve comprises a control valve, a gate valve, a check valve, a ball valve, a globe valve, a butterfly valve, a diaphragm valve, a needle valve, a pinch valve, a proportional valve, or a stepping motor valve. In some cases, in any of the preceding, the apparatus further comprises an electric motor that is operatively coupled to the flow regulation valve, wherein the electric motor is configured to control the flow regulation valve based on at least one measurement obtained from the pressure sensor. In some cases, in any of the preceding, the pressure sensor comprises a differential pressure sensor, and wherein the at least one measurement comprises a real time flow rate measurement through the first conduit. In some cases, in any of the preceding, the flow regulation valve comprises a triple offset butterfly valve or a proportional valve. In some cases, in any of the preceding, the apparatus further comprises a controller that is configured to provide at least one command to the electric motor to incrementally open and close the flow regulation valve to a predetermined position or orientation. In some cases, in any of the preceding, the at least one command is generated in part based on (i) a user input corresponding to a desired pressure drop across the first conduit and (ii) the one or more measurements obtained from the first pressure sensor. In some cases, in any of the preceding, the second conduit comprises a pressure sensor. In some cases, in any of the preceding, the pressure sensor is a differential pressure sensor. In some cases, in any of the preceding, the second conduit comprises a flow regulation valve that is configured to regulate the flow rate of a fluid through the second conduit. In some cases, in any of the preceding, the second conduit comprises a pressure sensor and a flow regulation valve that is configured to regulate the flow rate of a fluid through the second conduit. In some cases, in any of the preceding, the apparatus further comprises an electric motor that is operatively coupled to the flow regulation valve, wherein the electric motor is configured to control the flow regulation valve. In some cases, in any of the preceding, the apparatus further comprises an electric motor that is operatively coupled to the flow regulation valve, wherein the electric motor is configured to control the flow regulation valve based on at least one measurement obtained from the pressure sensor. In some cases, in any of the preceding, the pressure sensor comprises a differential pressure sensor, and wherein the at least one measurement comprises a real time flow rate measurement through the second conduit. In some cases, in any of the preceding, the flow regulation valve comprises a triple offset butterfly valve or a proportional valve. In some cases, in any of the preceding, the apparatus further comprises a controller that is configured to provide at least one command to the electric motor to incrementally open and close the flow regulation valve to a predetermined position or orientation.

In some cases, in any of the preceding, the at least one command is generated in part based on (i) a user input corresponding to a desired pressure drop across the first conduit and (ii) the one or more measurements obtained from the first pressure sensor. In some cases, in any of the preceding, the apparatus further comprises a controller. In some cases, in any of the preceding, the apparatus further comprises a mating plane sensor configured to obtain positioning information for the movable platform, wherein the positioning information corresponds to a position or an orientation of the movable platform or the inhaler relative to the first input port or the second input port. In some cases, in any of the preceding, the mating plane sensor is configured to detect a position of the first input port or the second input port relative to the movable platform. In some cases, in any of the preceding, the mating plane sensor is configured to detect when the inhaler is aligned with the first input port or the second input port. In some cases, in any of the preceding, the mating plane sensor is configured to detect an offset between a position or an orientation of the inhaler and a position or an orientation of the first input port or the second input port. In some cases, in any of the preceding, the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port. In some cases, in any of the preceding, the apparatus further comprises a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port. In some cases, in any of the preceding, the first inlet port and the second inlet port comprise a mating ring that is configured to releasably couple to the inhaler to create a seal. In some cases, in any of the preceding, the inhaler comprises a mating ring that is fitted to a portion of the inhaler. In some cases, in any of the preceding, the mating ring is configured to create a seal between the inhaler and the first inlet port or the second inlet port when the inhaler is positioned adjacent to the first inlet port or the second inlet port. In some cases, in any of the preceding, the mating ring comprises a soft silicone rubber or a soft compliant material that is configured to create a reliable seal between the inhaler and the first inlet port or the second inlet port. In some cases, in any of the preceding, at least one or both of the first conduit or the second conduit comprises at least one, two, or three of a laminar flow conditioner, a flow tube, or a flow verifier. In some cases, in any of the preceding, the apparatus further comprises a third conduit comprising a third inlet port and a third fluid flow path, wherein the third fluid flow path is in fluid communication with the third inlet port. In some cases, in any of the preceding, the movable platform is configured to mate the inhaler to at least one of the first inlet port, the second inlet port, or the third inlet port in response to a user input corresponding to a selection of a desired input port. In some cases, in any of the preceding, the flow verifier is configured to obtain one or more measurements corresponding to a flow rate or a mass flow rate through the first conduit or the second conduit. In some cases, in any of the preceding, the flow verifier is configured to provide the one or more measurements to a mass flow controller that is configured to adjust an operation of the breathing simulator.

In another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the first conduit and/or the second conduit comprises a flow regulation valve that is configured to regulate the flow rate of a fluid through the first conduit and/or the second conduit, and wherein the flow regulation valve is a proportional valve.

In another aspect, a dose collection apparatus is provided comprising: (a) a first conduit comprising a first inlet port and a first fluid flow path, wherein the first fluid flow path is in fluid communication with the first inlet port and a first dose collector module; (b) a second conduit comprising a second inlet port and a second fluid flow path, wherein the second fluid flow path is in fluid communication with the second inlet port and a second dose collector module; (c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein the inhaler comprises a mating ring that is fitted to a portion of the inhaler.

In some cases, in any of the preceding, the first dose collector module is a dose unit sampling apparatus (DUSA). In some cases, in any of the preceding, the first dose collector module comprises a low resistance filter configured to capture the dose provided by the inhaler. In some cases, in any of the preceding, the low resistance filter is configured to retain aerosolized particles with a particle size ranging from about 0.1 micrometers (µm) to about 10 µm. In some cases, in any of the preceding, the low resistance filter has a flow resistance of about 150 Pascals at a flow rate of about 90 liters of air per minute. In some cases, in any of the preceding, the first dose collector module is a cascade impactor. In some cases, in any of the preceding, the first dose collector module is an optical spray or an aerosol analyzer. In some cases, in any of the preceding, the second dose collector module is a waste collector. In some cases, in any of the preceding, the first inlet port is located at one end of the first conduit, and wherein the first dose collector module is located at the opposite end of the first conduit. In some cases, in any of the preceding, the second inlet port is located at one end of the second conduit, and wherein the second dose collector module is located at the opposite end of the second conduit. In some cases, in any of the preceding, the apparatus comprises a manifold that is configured to converge the first conduit and the second conduit into an outlet conduit, wherein the outlet conduit comprises an outlet port that is in fluid communication with a vacuum source. In some cases, in any of the preceding, at most one of the first conduit and the second conduit is operational at a given time instance. In some cases, in any of the preceding, the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation. In some cases, in any of the preceding, the breathing simulator is configured to induce the flow through at most one of the first conduit and the second conduit at a given time instance. In some cases, in any of the preceding, the breathing simulator is configured to generate a user programmable output trigger signal. In some cases, in any of the preceding, the output trigger signal is programmed to trigger at a user specified time that is within a time period required for the breathing simulator to execute a breathing profile. In some cases, in any of the preceding, the actuator is configured to (i) shake the inhaler and/or (ii) actuate the inhaler to provide the dose to at least one of the first conduit and the second conduit. In some cases, in any of the preceding, the actuator is configured to receive the output trigger signal described in any of the preceding. In some cases, in any of the preceding, the actuator is configured to actuate the device upon receipt of the output trigger signal described in any of the preceding. In some cases, in any of the preceding, the first conduit comprises a pressure sensor. In some cases, in any of the preceding, the pressure sensor is a differential pressure sensor. In some cases, in any of the preceding, the first conduit comprises a flow regulation valve that is configured to regulate the flow rate of a fluid through the first conduit. In some cases, in any of the preceding, the apparatus comprises a plurality of flow regulation valves that are configured to independently control or regulate flow through each of a plurality of conduits, wherein the plurality of conduits comprises at least the first conduit and the second conduit. In some cases, in any of the preceding, the first conduit comprises a pressure sensor and a flow regulation valve that is configured to regulate the flow rate of a fluid through the first conduit. In some cases, in any of the preceding, the apparatus further comprises an electric motor that is operatively coupled to the flow regulation valve, wherein the electric motor is configured to control the flow regulation valve. In some cases, in any of the preceding, the flow regulation valve comprises a control valve, a gate valve, a check valve, a ball valve, a globe valve, a butterfly valve, a diaphragm valve, a needle valve, a pinch valve, a proportional valve, or a stepping motor valve. In some cases, in any of the preceding, the apparatus further comprises an electric motor that is operatively coupled to the flow regulation valve, wherein the electric motor is configured to control the flow regulation valve based on at least one measurement obtained from the pressure sensor. In some cases, in any of the preceding, the pressure sensor comprises a differential pressure sensor, and wherein the at least one measurement comprises a real time flow rate measurement through the first conduit. In some cases, in any of the preceding, the flow regulation valve comprises a triple offset butterfly valve or a proportional valve. In some cases, in any of the preceding, the apparatus further comprises a controller that is configured to provide at least one command to the electric motor to incrementally open and close the flow regulation valve to a predetermined position or orientation. In some cases, in any of the preceding, the at least one command is generated in part based on (i) a user input corresponding to a desired pressure drop across the first conduit and (ii) the one or more measurements obtained from the first pressure sensor. In some cases, in any of the preceding, the second conduit comprises a pressure sensor. In some cases, in any of the preceding, the pressure sensor is a differential pressure sensor. In some cases, in any of the preceding, the second conduit comprises a flow regulation valve that is configured to regulate the flow rate of a fluid through the second conduit. In some cases, in any of the preceding, the conduit comprises a pressure sensor and a flow regulation valve that is configured to regulate the flow rate of a fluid through the second conduit. In some cases, in any of the preceding, the apparatus further comprises an electric motor that is operatively coupled to the flow regulation valve, wherein the electric motor is configured to control the flow regulation valve. In some cases, in any of the preceding, the apparatus further comprises an electric motor that is operatively coupled to the flow regulation valve, wherein the electric motor is configured to control the flow regulation valve based on at least one measurement obtained from the pressure sensor. In some cases, in any of the preceding, the pressure sensor comprises a differential pressure sensor, and wherein the at least one measurement comprises a real time flow rate measurement through the second conduit. In some cases, in any of the preceding, the flow regulation valve comprises a triple offset butterfly valve or a proportional valve. In some cases, in any of the preceding, the apparatus further comprises a controller that is configured to provide at least one command to the electric motor to incrementally open and close the flow regulation valve to a predetermined position or orientation. In some cases, in any of the preceding, the at least one command is generated in part based on (i) a user input corresponding to a desired pressure drop across the first conduit and (ii) the one or more measurements obtained from the first pressure sensor. In some cases, in any of the preceding, the apparatus further comprises a controller. In some cases, in any of the preceding, the apparatus further comprises a mating plane sensor configured to obtain positioning information for the movable platform, wherein the positioning information corresponds to a position or an orientation of the movable platform or the inhaler relative to the first input port or the second input port. In some cases, in any of the preceding, the mating plane sensor is configured to detect a position of the first input port or the second input port relative to the movable platform. In some cases, in any of the preceding, the mating plane sensor is configured to detect when the inhaler is aligned with the first input port or the second input port. In some cases, in any of the preceding, the mating plane sensor is configured to detect an offset between a position or an orientation of the inhaler and a position or an orientation of the first input port or the second input port. In some cases, in any of the preceding, the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port. In some cases, in any of the preceding, the apparatus further comprises a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port. In some cases, in any of the preceding, the first inlet port and the second inlet port comprise a mating ring that is configured to releasably couple to the inhaler to create a seal. In some cases, in any of the preceding, the inhaler comprises a mating ring that is fitted to a portion of the inhaler. In some cases, in any of the preceding, the mating ring is configured to create a seal between the inhaler and the first inlet port or the second inlet port when the inhaler is positioned adjacent to the first inlet port or the second inlet port. In some cases, in any of the preceding, the mating ring comprises a soft silicone rubber or a soft compliant material that is configured to create a reliable seal between the inhaler and the first inlet port or the second inlet port. In some cases, in any of the preceding, at least one or both of the first conduit or the second conduit comprises at least one, two, or three of a laminar flow conditioner, a flow tube, or a flow verifier. In some cases, in any of the preceding, the apparatus further comprises a third conduit comprising a third inlet port and a third fluid flow path, wherein the third fluid flow path is in fluid communication with the third inlet port. In some cases, in any of the preceding, the movable platform is configured to mate the inhaler to at least one of the first inlet port, the second inlet port, or the third inlet port in response to a user input corresponding to a selection of a desired input port. In some cases, in any of the preceding, the flow verifier is configured to obtain one or more measurements corresponding to a flow rate or a mass flow rate through the first conduit or the second conduit. In some cases, in any of the preceding, the flow verifier is configured to provide the one or more measurements to a mass flow controller that is configured to adjust an operation of the breathing simulator.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

Figure 1A:
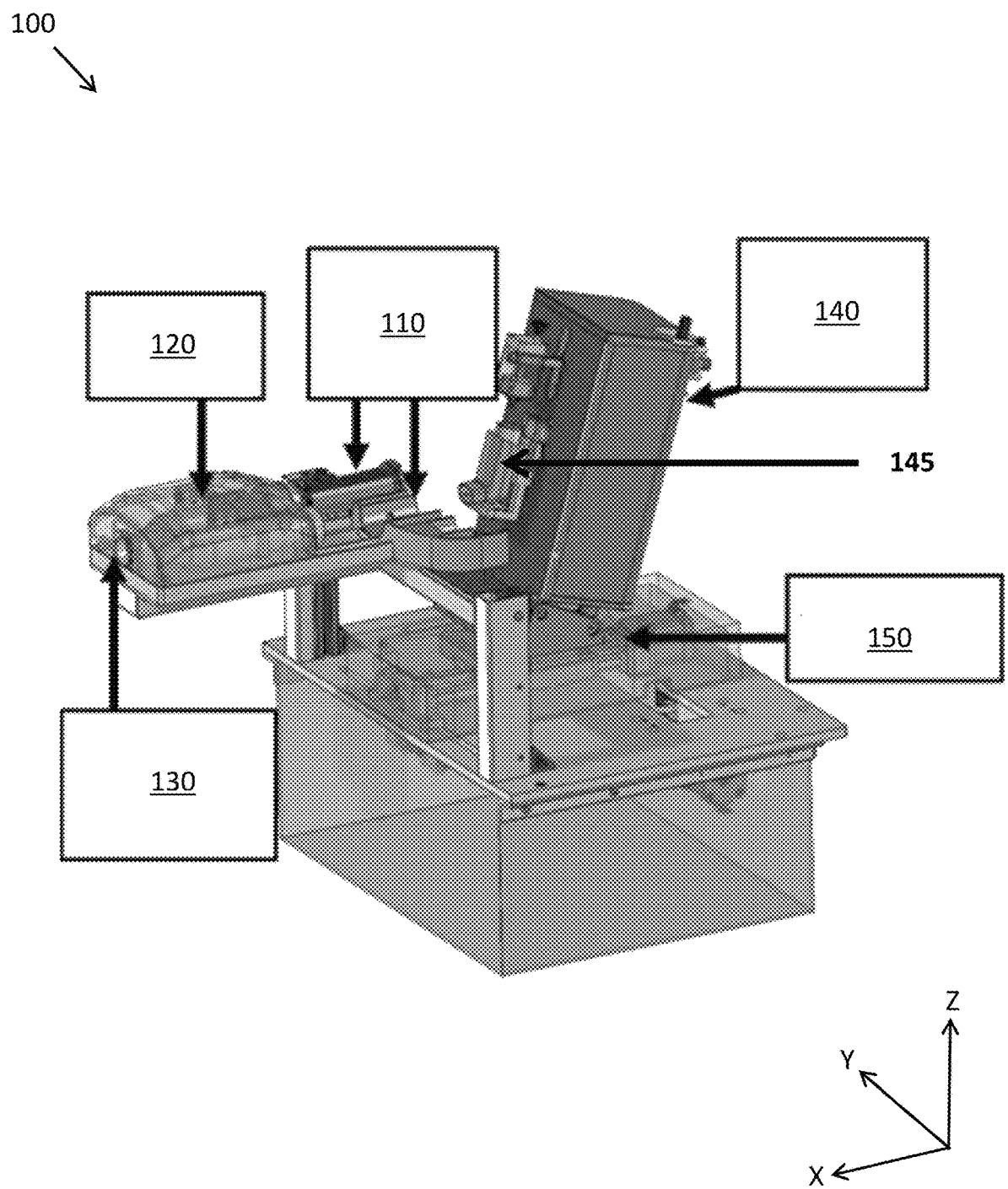
FIG. 1A and FIG. 1B schematically illustrate an apparatus for testing drug delivery devices, in accordance with some embodiments described herein.
Figure 1B:
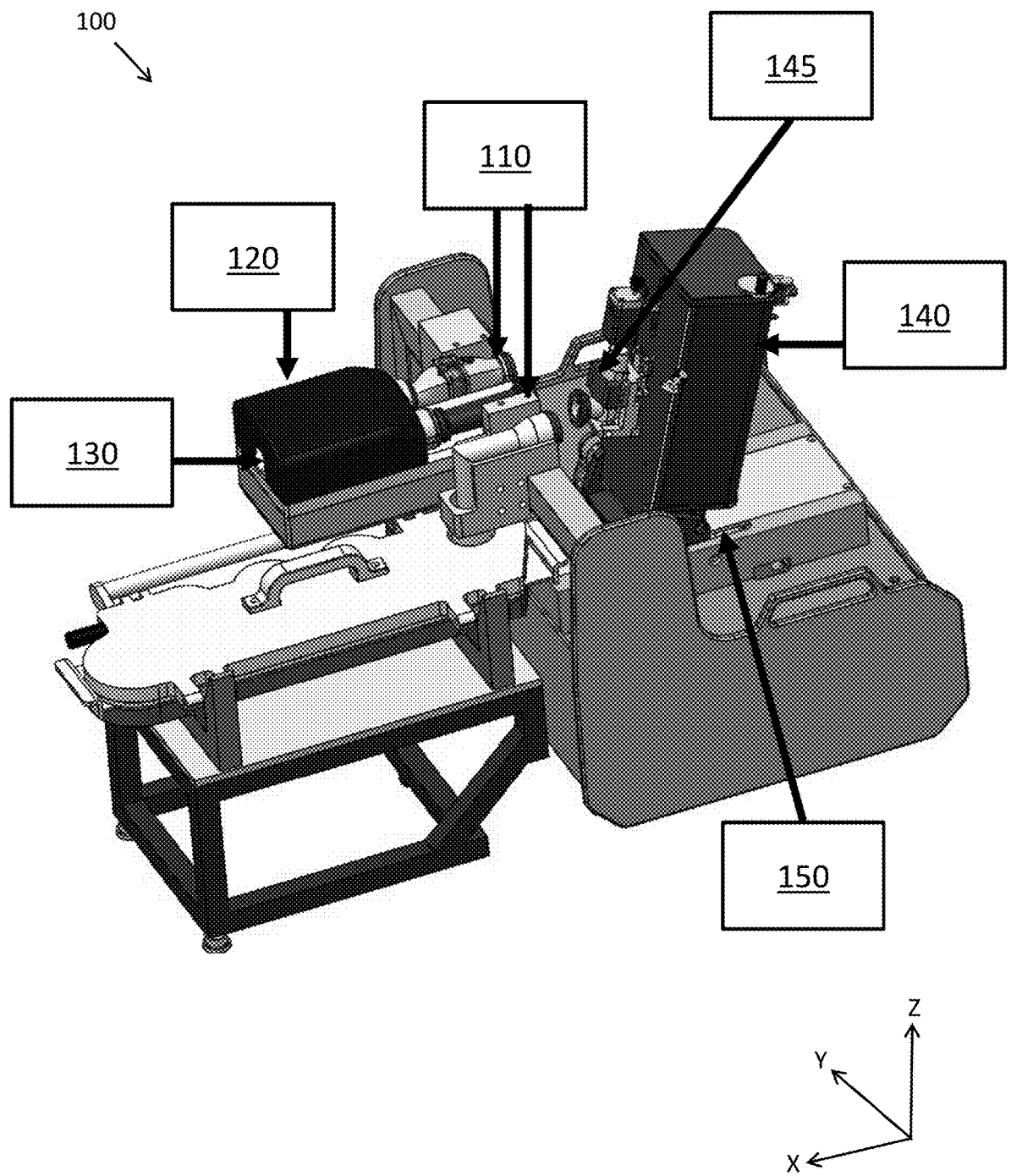
Figure 2:
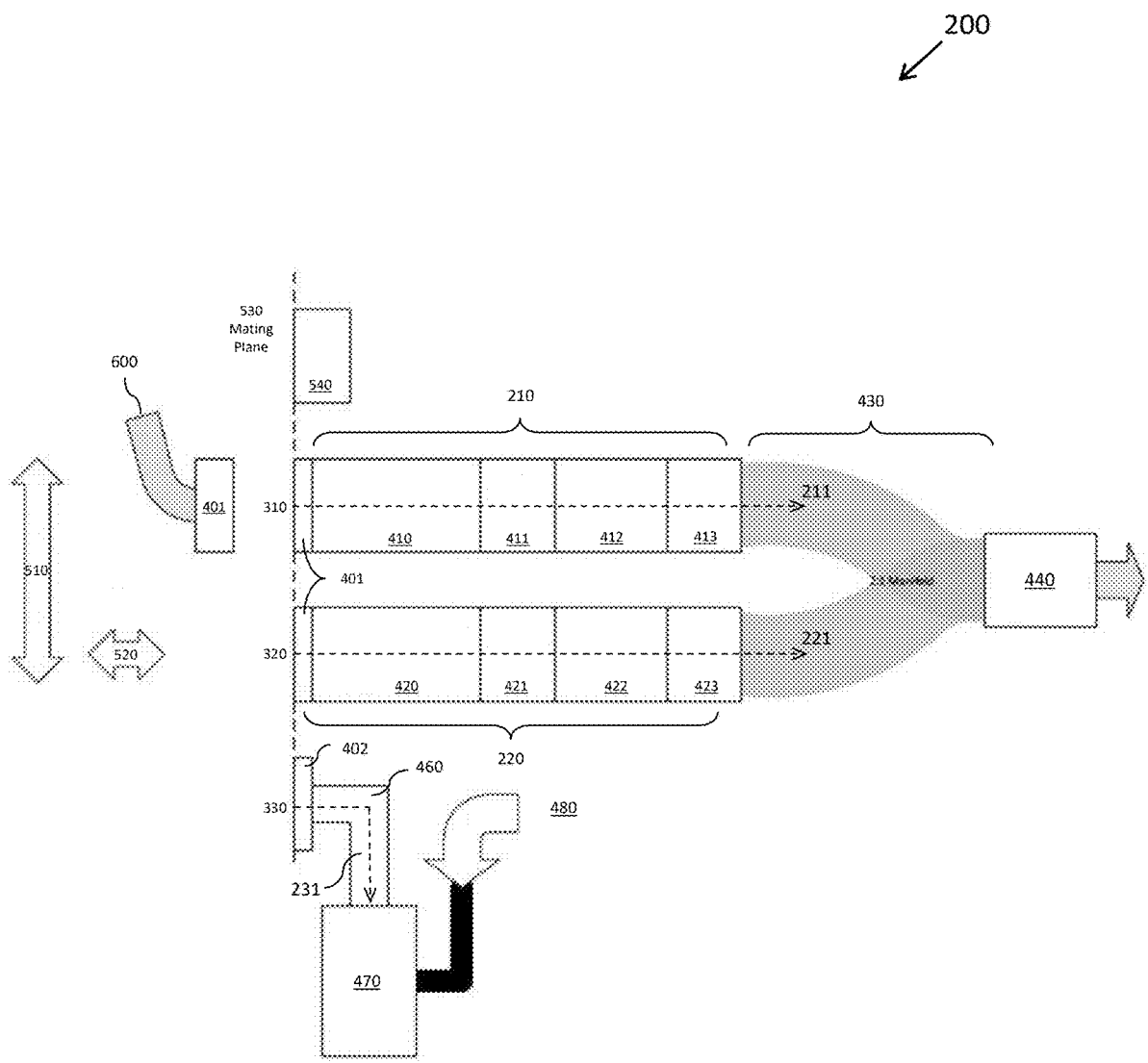
FIG. 2 schematically illustrates a dose collection apparatus comprising a plurality of conduits, in accordance with some embodiments described herein.

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

Whenever the term "at least," "greater than" or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the terms "delivered dose" or "emitted dose" or "sample dose" or "aerosol sample" are used interchangeably herein and generally refer to the total amount of drug emitted from a drug delivery device (e.g., MDI or pMDI or DPI) and available to the user when the drug delivery device is actuated.

The term "real time" or "real-time," as used interchangeably herein, generally refers to a simultaneous or substantially simultaneous occurrence of a first event or action with respect to an occurrence of a second event or action. A real-time action or event may be performed within a response time of less than one or more of the following: ten seconds, five seconds, one second, a tenth of a second, a hundredth of a second, a millisecond, or less relative to at least another event or action. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less. A real-time action may be performed using one or more sensor or computer processors.

Dose Collection Apparatus

In an aspect, the present disclosure provides a dose collection apparatus. The dose collection apparatus may be configured to test a performance of one or more drug delivery devices configured to provide one or more doses of a drug or a substance. The dose collection apparatus may be configured to test an ability of one or more drug delivery devices to consistently provide one or more doses of a drug or a substance. The dose collection apparatus may be configured to collect and/or analyze one or more doses provided by the one or more drug delivery devices. The one or more doses may comprise a drug or a substance that may be delivered by an operation or an actuation of the one or more drug delivery devices. In some cases, the one or more doses may be provided as an aerosol spray. The aerosol spray may comprise a drug or a substance that is released as a fine spray using a propellant gas. In some cases, the one or more doses may be provided as a dry powder. In some cases, the one or more doses may be provided as a sample dose that may be tested. In some cases, the one or more doses may be provided as a waste dose that may not or need not be tested.

The one or more drug delivery devices may comprise an inhaler device. The inhaler device may include a formulation of, for example, a drug or an active ingredient. In some cases, the formulation may include one or more excipients. In some cases, the formulation may not or need not include any excipients. In some cases, the formulation includes one or more propellants. The formulation may be a suspension, a solution, or a dry powder. In some cases, the inhaler device may comprise a pressurized metered dose inhaler (pMDI), a metered dose inhaler (MDI), a soft mist inhaler (SMI), a small-volume nebulizer (SVN), and/or a dry powder inhaler (DPI).

The inhaler device may be used for delivery of a drug or a substance directly to the lungs of a subject. The systems and methods described herein may be suitable for use with any drug delivery device or inhaler device that requires shaking and/or actuation. In some cases, the inhaler device may comprise a metered-dose inhaler (MDI) or a pressurized metered-dose inhaler (pMDI). Non-limiting examples of MDIs may include AeroChamber® and Autohaler®. In some cases, the MDI may comprise a spacer or aerosol holding chamber. The inhaler device may be a dry powder inhaler, non-limiting examples including: Aerolizer®, Diskus®, Ellipta™, Flexhaler®, Handihaler®, Neohaler®, Pressair™, Twisthaler®, Rotahaler®, and Turbuhaler®.

In some cases, the one or more drug delivery devices may comprise a nasal device. The nasal device may be configured for local delivery of a drug to the nose or the paranasal sinuses. Non-limiting examples of nasal devices may include mechanical spray pumps (e.g., squeeze bottles, multi-dose metered-dose spray pumps, single/duo-dose spray pumps, bi-directional multi-dose spray pumps), gas-driven spray systems/atomizers, mechanical powder sprayers, breath actuated inhalers, and insufflators.

In some cases, the one or more drug delivery devices may comprise an Orally Inhaled or Nasal Drug Product (OINDP). Non-limiting examples of OINDPs which may be suitable for use with the systems and methods described herein may include: aclidinium bromide inhalation powder (Tudorza® Pressair®), ipratropium inhalation aerosol (Atrovent® HFA), tiotropium inhalation powder Spiriva® Handihaler®, tiotropium inhalation solution (Spiriva® Respimat®), umeclidinium inhalation powder (Incruse® Ellipta®), albuterol/ipratropium inhalation solution (DuoNeb), albuterol/ipratropium bromide inhalation spray (Combivent® Respimat®), budesonide/formoterol fumarate dihydrate inhalation aerosol (Symbicort®), fluticasone/salmeterol inhalation powder (Advair® Diskus®), fluticasone/salmeterol inhalation aerosol (Advair® HFA), fluticasone furoate/vilanterol inhalation powder (Breo® Ellipta®), mometasone furoate/formoterol fumarate inhalation aerosol (Dulera®), tiotropium bromide/olodaterol inhalation spray (Stiolto™ Respimat®), umeclidinium/vilanterol inhalation powder (Anoro® Ellipta®), beclomethasone dipropionate HFA inhalation aerosol (Qvar®), budesonide inhalation powder (Pulmicort® Flexhaler®), budesonide inhalation suspension (Pulmicort®

Respules®), ciclesonide inhalation aerosol (Alvesco®), flunisolide inhalation aerosol (Aerospan®), fluticasone furoate inhalation powder (Arnuity™ Ellipta®), fluticasone propionate inhalation aerosol (Flovent® HFA), fluticasone propionate inhalation powder) (Flovent® Diskus®), mometasone furoate inhalation powder (Asmanex® Twisthaler®), mometasone furoate inhalation aerosol (Asmanex® HFA), arformoterol tartrate inhalation solution (Brovana®), formoterol fumarate inhalation powder (Foradil), formoterol fumarate inhalation solution (Perforomist®), indacaterol inhalation powder (Arcapta™ Neohaler®), olodaterol inhalation spray (Striverdi® Respimat®), salmeterol xinafoate inhalation powder (Serevent® Diskus®), albuterol sulfate inhalation powder (Proair® Respiclick®), albuterol sulfate inhalation aerosol (Proair® HFA), albuterol inhalation solution (AccuNeb®), albuterol sulfate inhalation aerosol (Proventil® HFA), albuterol sulfate inhalation aerosol (Ventolin® HFA), or levalbuterol tartrate inhalation aerosol (Xopenex® HFA).

The dose collection apparatus may be configured to evaluate and/or test a performance of one or more drug delivery devices. Evaluating and/or testing a performance of the one or more drug delivery devices may comprise determining an amount and uniformity of a delivered dose.

In some cases, evaluating and/or testing a performance of the one or more drug delivery devices may comprise determining a delivered dose uniformity (DDU). The delivered dose uniformity may correspond to a uniformity of the delivered dose of a drug emitted from a drug delivery device over multiple uses.

In some cases, evaluating and/or testing a performance of the one or more drug delivery devices may comprise determining or evaluating a dose content uniformity (DCU) and/or an aerodynamic particle size distribution (APSD) associated with one or more doses provided by the one or more drug delivery devices. Dose content uniformity may refer to a uniformity of an emitted drug per actuation, consistent with a label claim of the drug product. Aerodynamic particle size distribution may correspond to a spatial distribution of the particles in a drug dose that is provided by a drug delivery device and inhaled by a subject. The drug doses may be provided as an aerosol cloud or a dry powder comprising one or more particles. The spatial distribution may indicate a plurality of locations where the particles in the aerosol cloud or the dry powder are likely to deposit following inhalation. The aerodynamic particle size distribution may depend on a size of the particles. If the particles are too large, they may be deposited at the back of a subject's throat instead of at a desired target region. If the particles are too small, they may be exhaled rather than deposited on a desired target region.

In some cases, evaluating and/or testing a performance of the one or more drug delivery devices may comprise determining or evaluating a shot weight performance, a spray pattern, a plume geometry, and/or droplet or particle size distribution associated with the one or more drug delivery devices or one or more doses delivered using the one or more drug delivery devices. A shot weight may correspond to the weight of a single metered dose. A spray pattern may correspond to a pattern that is generated by one or more particles released from a pressurized source. A spray pattern may refer to any characteristics of the spray, e.g., including the spray's divergence angle (e.g., plume geometry) as the spray exits the device, the spray's cross-sectional ellipticity, uniformity, and/or particle/droplet distribution. The spray pattern may comprise an optical spray pattern or an impaction-based spray pattern. The plume geometry may comprise one or more physical characterizations of a size and/or a shape of a plume that is generated when one or more particles are released from a pressurized source.

In some instances, the spray pattern may be measured or analyzed by illuminating a spray plume with an illumination device (e.g., a laser), and then capturing an image of the spray plume with an imaging device (e.g., a camera). In other instances, impaction-based methods may be used to analyze spray patterns. In one non-limiting example, spray pattern analysis may involve firing the spray pump at a solid, thin-layer chromatography (TLC) surface having a coating that fluoresces in response to incident ultraviolet ("UV") radiation. The pattern of the spray deposited on the surface may then be analyzed. In some cases, a dose content uniformity (DCU) performance of the inhaler or drug delivery device may be determined based on the spray pattern. Optionally, the spray pattern measurements may be correlated with a DCU. In some cases, a spray pattern measurement may be used to determine an optimal set of shake parameters, e.g., for specific drug formulations and/or specific drug delivery devices. In some instances, the spray pattern measurements may be used to verify a desired performance and/or a consistency of performance of the drug delivery devices (e.g., oral inhalers) after shaking.

In some cases, evaluating and/or testing a performance of the one or more drug delivery devices may comprise comparing the performance of the one or more drug delivery devices with a target performance level that is defined by regulatory or industry guidelines (e.g., by the U.S. Food and Drug Administration).

In some cases, evaluating and/or testing a performance of the one or more drug delivery devices may comprise through-life testing. Through-life testing of the one or more drug delivery devices may comprise testing a beginning-of-life (BoL), a middle-of-life (MoL), and/or an end-of-life (EoL) performance of the one or more drug delivery devices. BoL administration may refer to actuating the drug delivery device at the beginning of the labeled number of sprays (after any required priming sprays have been wasted as waste doses, and usually within about the first 5% of the labeled number of sprays). MoL administration may refer to actuating the drug delivery device at the middle of the labeled number of sprays (within about 45-55% of the labeled number of sprays). EoL administration may refer to actuating the drug delivery device at the end of the labeled number of sprays (within about the last 95% of the labeled number of sprays).

In some cases, evaluating and/or testing a performance of the one or more drug delivery devices may comprise actuating the drug delivery device such that the drug delivery device fires and/or delivers one or more doses into the dose collection apparatus. The dose collection apparatus may comprise a conduit, a dose collector module, and/or a container that contains a filter configured to catch one or more doses provided by the one or more drug delivery devices. In some cases, the conduit, the dose collector module, and/or the container may be connected to a negative pressure source during testing to broadly simulate inhalation.

In some embodiments, the dose collection apparatus may comprise (a) a first conduit comprising a first inlet port and a first fluid flow path. The first fluid flow path may be in fluid communication with the first inlet port and a first dose collector module.

In some embodiments, the dose collection apparatus may comprise (b) a second conduit comprising a second inlet port and a second fluid flow path. The second fluid flow path may be in fluid communication with the second inlet port and a second dose collector module.

The first conduit and the second conduit may comprise a hollow region through which one or more doses provided by a drug delivery device may travel. The one or more doses may travel along a fluid flow path that corresponds to the size and/or shape of the hollow region. The fluid flow path may direct one or more doses provided by the one or more drug delivery devices from a first end of the first/second conduit to a second end of the first/second conduit.

In some embodiments, the dose collection apparatus may comprise (c) a movable platform configured to mate a drug delivery device to at least one of the first inlet port or the second inlet port. In some cases, the drug delivery device may comprise an inhaler as described above.

In some embodiments, the dose collection apparatus may comprise (d) an actuator configured to operate the inhaler to provide a dose to at least one of the first conduit or the second conduit. In some cases, the dose may comprise a sample dose or a waste dose.

In some embodiments, at least one of the first dose collector module or the second dose collector module may comprise a dose unit sampling apparatus (DUSA), a cascade impactor, an optical spray or aerosol analyzer, and/or a waste collector.

In some cases, at least one of the first dose collector module or the second dose collector module may comprise a low resistance filter to capture an aerosol. The low resistance filter may be configured to retain aerosolized drugs with a particle size ranging between 0.1 µm and 10 µm. The low resistance filter may be configured to permit a flow rate ranging from about 1 liter of air per minute to about 200 liters of air per minute. The low resistance filter may comprise a plurality of pores with a pore size that is greater than about 0.01 µm and less than about 10 µm. The low resistance filter may have a flow resistance of about 150 Pascals at a flow rate of about 90 liters of air per minute. The low resistance filter may have a thickness (in a flat or flattened form) ranging from about 0.1 millimeter to about 1 millimeter. The low resistance filter may have one or more dimensions (e.g., a height, a width, a diameter, etc.) ranging from about 1 millimeter to about 10 centimeters.

In some embodiments, the low resistance filter may comprise a low resistance, pleated filter media. The low resistance, pleated filter media may be formed from a sheet of material (e.g., nylon, polypropylene, polystyrene, polyester, paper, cotton, or any other suitable filter material) that is folded into pleats to increase a surface area of the filter that is usable to capture airborne particles. The pleats may comprise a plurality of folds held together by stitching or adhesives. The low resistance, pleated filter media may be configured to trap more airborne particles than a low resistance filter media without pleats. In some cases, the low resistance filter media may comprise a non-woven, electrostatically charged filter media. The non-woven, electrostatically charged filter media can comprise a non-woven synthetic fiber. In some cases, the non-woven, electrostatically charged filter media may comprise, for example, polypropylene, polystyrene, or nylon. In some embodiments, the non-woven, electrostatically charged filter media may comprise electrically charged polypropylene, electrically charged polystyrene, or electrically charged nylon. In some embodiments, the non-woven, electrostatically charged filter media may comprise an electrostatic filter with a first set of fibers that are positively charged and a second set of fibers that are negatively charged. In some cases, about 50% of the fibers may be positively charged and about 50% of the fibers may be negatively charged. In some embodiments, the non-woven, electrostatically charged filter media may comprise a hydrophobic material.

In some embodiments, the low resistance filter may comply with one or more test specifications set by a user. For example, in an embodiment, the low resistance filter may be inert and may not react with the drug. In another example, the filter may be inert and may not react with one or more solvents used to prepare a sample for testing. In an embodiment, the filter may comprise a glass fiber filter. In an embodiment, the filter may have an aerosol retention of about 0.3 microns. In an embodiment, the filter may enable dosage collection at flow rates up to about 100 L/min. In an embodiment, the filter may comprise a material sufficient to retain the sample dose while allowing a fluid or a gas (e.g., air) to flow through the filter. In an embodiment, the filter may have an aerosol retention sufficient to retain one or more sample doses provided by a drug delivery device such as an MDI, pMDI, or DPI. In an embodiment, the filter may be configured to collect an aerosol sample at flow rates up to rates sufficient to perform one or more tests using the apparatus. In an embodiment, the filter may be capable of capturing, trapping, or absorbing an aerosol sample corresponding to a single dose of the contents of a drug delivery device. In an embodiment, the filter may be capable of capturing, trapping, or absorbing an aerosol sample corresponding to the entire contents of a drug delivery device. In an embodiment, the filter may be capable of capturing, trapping, or absorbing an aerosol sample corresponding to about 100%, or about 90%, or about 80%, or about 70%, or about 60%, or about 50%, or about 40%, or about 30%, or about 20%, or about 10%, or less of the contents of the dose emitted by the drug delivery device from a single actuation. In some embodiments, the filter may be configured to degrade or dissolve when solvent is added. In an embodiment, the degradation of the filter may aid in the collection of aerosol samples that are captured, trapped, or absorbed by the filter. In an embodiment, the filter may comprise an open-mesh filter support. In an embodiment, the open-mesh filter support may comprise a stainless steel screen. In an embodiment, the open-mesh filter support may comprise a plastic material. In an embodiment, the filter support may comprise an inert material. The filter support may comprise a shape. In some cases, the shape may be circular or elliptical. In other cases, the shape may be a polygon with three or more sides. The polygon may comprise two or more sides with a same length. Alternatively, the polygon may comprise two or more sides with different lengths. In some embodiments, the filter support may be shaped in the form of a hexagonal honeycomb to provide an optimal ratio of high air flow cross sectional area and mechanical support.

In some embodiments, the first dose collector module may comprise a dose unit sampling apparatus (DUSA). In some embodiments, the first dose collector module may comprise a cascade impactor. In some embodiments, the first dose collector module may comprise an optical spray or aerosol analyzer. In some embodiments, the second dose collector module may comprise a waste collector.

In some cases, the apparatus may comprise three or more conduits. In some cases, the apparatus may comprise three or more dose collector modules. In such cases, at least one of the three or more dose collector modules may comprise a dose unit sampling apparatus (DUSA), a cascade impactor, an optical spray or aerosol analyzer, and/or a waste collector. In some cases, the three or more dose collector modules may comprise a different set of components. For example, a first dose collector module may comprise a DUSA, a second dose collector module may comprise a cascade impactor, a third dose collector module may comprise an optical spray or aerosol analyzer, and a fourth dose collector module may comprise a waste collector.

In some embodiments, the apparatus may comprise two or more conduits in fluid communication with two or more dose collector modules. In some cases, the two or more conduits may be parallel to each other. In some cases, the two or more conduits may not or need not be parallel to each other.

The two or more conduits may comprise two or more inlets. The two or more inlets may be arranged in a lateral or side-by-side configuration. The two or more inlets may be arranged in a circular configuration such that the respective centers of the inlets are equidistant from a center point around which the two or more inlets are arranged.

In some embodiments, the first inlet port of the first conduit may be located at one end of the first conduit, and the first dose collector module may be located at the opposite end of the first conduit. In some embodiments, the second inlet port of the second conduit may be located at one end of the second conduit, and the second dose collector module may be located at the opposite end of the second conduit.

In some cases, the apparatus may further comprise a third conduit comprising a third inlet port and a third fluid flow path. The third fluid flow path may be in fluid communication with the third inlet port.

In some embodiments, the apparatus may comprise a manifold that is configured to converge the first conduit and the second conduit into an outlet conduit. The outlet conduit may comprise an outlet port that is in fluid communication with a vacuum source.

In some cases, the vacuum source may comprise a negative pressure source. In an embodiment, the negative pressure source may be configured to induce a steady flow rate through the one or more conduits. In an embodiment, the negative pressure source may comprise a flow regulator and/or a flowmeter. The negative pressure source may be configured to pull a gas or a fluid (e.g., air) or one or more sample doses through the conduits at a desired flow rate.

In some cases, the vacuum source may comprise a breathing simulator that is configured to induce a flow from one end of the first or second conduit to the opposite end of the respective first or second conduit to simulate inhalation. In addition, flow can be induced in the reverse direction from said opposite end to said one end to simulate exhalation. In some cases, the breathing simulator may be configured to generate a user programmable output trigger signal. In some cases, the breathing simulator may be configured to provide the user programmable output trigger signal to another component of the apparatus (e.g., the actuator or the breathing simulator). The output trigger signal may be programmed to trigger another event (e.g., shaking and/or actuation of the drug delivery device) at a user specified time that is within the time required for the breathing profile to execute.

In any of the embodiments described herein, at most one conduit may operate at a time. For example, when the first conduit is in operation, the second conduit may not be operational (e.g., the apparatus may be configured to inhibit or limit a movement of the one or more doses through the second conduit). In some cases, the second conduit may be configured to be non-operational when a flow regulator (e.g., a valve) in the second conduit restricts flow through the second conduit, or when the vacuum source does not induce a flow from one end of the second conduit to another end of the second conduit.

The apparatus may comprise an actuator. The actuator may be configured to (i) shake the inhaler and/or (ii) actuate the inhaler to provide the dose to at least one of the first conduit or the second conduit. In some cases, the actuator may be equipped to receive the output trigger signal. In some cases, the actuator may be configured to actuate the one or more drug delivery devices upon receiving the output trigger signal generated and/or provided by the breathing simulator. The output trigger signal may be configured to implement a predetermined delay between an operation of the breathing simulator and the actuation of the drug delivery devices.

The actuator may be configured to shake the inhaler. The actuator may be configured to shake the inhaler according to one or more shaking regimens. The one or more shaking regimens may be specific for a particular drug delivery device or inhaler, and may be at least partially dependent on a formulation of the drug, one or more characteristics of the drug delivery device or inhaler, a volume of a metering valve of the drug delivery device or inhaler, a relative mixing efficiency of drug particles in the formulation with excipient(s) and/or propellant(s), or any combination thereof. The one or more shaking regimens may be adjusted based on the composition of the formulation present in the canister (e.g., the number of excipients present with the drug in the formulation or the specific composition of the excipients present in the formulation). Therefore, different products or drug delivery devices that include the same drug may require different shaking regimens to deliver an intended dosage range. In some embodiments, the systems and methods provided herein may allow a user or a tester of an inhaler or other drug delivery device to identify a specific set of shake parameters (e.g., shake regimen) required to deliver an intended dosage range of drug from a specific inhaler or drug delivery device.

The one or more shaking regimens may be generated based at least in part on one or more shake parameters. The one or more shake parameters may comprise a shake duration, a shake frequency, a shake angle, a shake-to-fire interval, and/or a shake orientation.

The term "shake duration" as used herein may refer to the length of time the inhaler or nasal device is shaken. In some instances, the shake duration may refer to a desired length of time the device should be shaken, e.g., as determined during a shake study. A desired shake duration may differ for different formulations of drugs (e.g., comprising different active ingredients and/or excipients). In some instances, a desired shake duration may differ for differing devices. A shake duration may be within a range of about 1 second to about 30 seconds. In some instances, a shake duration may be equal to, or greater than about 1 second, about 2 seconds, about 3 seconds, about 4 seconds, about 5 seconds, about 6 seconds, about 7 seconds, about 8 seconds, about 9 seconds, about 10 seconds, about 11 seconds, about 12 seconds, about 13 seconds, about 14 seconds, about 15 seconds, about 20 seconds, about 25 seconds, about 30 seconds, about 35 second, about 40 second, about 45 seconds, about 50 seconds, about 55 second, or about 60 seconds.

The term "shake angle" as used herein may refer to the angle of the canister of the device during shaking as measured from its vertical axis. For example, a shake angle of 90 degrees would include shaking the canister horizontally. In some instances, the shake angle may refer to a desired angle the device or canister of the device should be shaken in, e.g., as determined during a shake study described in the present disclosure. A desired shake angle may differ for different formulations of drugs (e.g., comprising different active ingredients and/or excipients). In some instances, a desired shake angle may differ for differing devices. A shake angle may be within a range of about 30 degrees to about 180 degrees. In some instances, a shake angle may be equal to, or greater than about 0 degrees, about 10 degrees, about 20 degrees, about 30 degrees, about 40 degrees, about 50 degrees, about 60 degrees, about 70 degrees, about 80 degrees, about 90 degrees, about 100 degrees, about 110 degrees, about 120 degrees, about 130 degrees, about 140 degrees, about 150 degrees, about 160 degrees, about 170 degrees, or about 180 degrees.

The term "shake frequency" as used herein may refer to the number of times (cycles) the device is shaken in a given time period. In some instances, the shake frequency may refer to a desired frequency the device should be shaken in a given time period, e.g., as determined during a shake study. A desired shake frequency may differ for different formulations of drugs (e.g., comprising different active ingredients and/or excipients). In some instances, a desired shake frequency may differ for differing devices. A shake frequency may be measured in Hertz (Hz) which is defined as the number of cycles in 1 second. A shake frequency may be within a range from about 1.0 Hz to about 5.0 Hz. In some instances, a shake frequency may be equal to, or greater than about 0.5 Hz, about 1.0 Hz, about 1.5 Hz, about 2.0 Hz, about 2.5 Hz, about 3.0 Hz, about 3.5 Hz, about 4.0 Hz, about 4.5 Hz, about 5.0 Hz, about 6.0 Hz, about 7.0 Hz, about 8.0 Hz, about 9.0 Hz, or about 10.0 Hz.

The term "shake-to-fire interval" as used herein may refer to the length of time that occurs between the end of a shaking regimen and the actuation of the device. In some instances, the shake-to-fire interval may refer to a desired length of time that occurs between the end of a shaking regimen and the actuation of the device, e.g., as determined during a shake study. A desired shake-to-fire interval may differ for different formulations of drugs (e.g., comprising different active ingredients and/or excipients). In some instances, a desired shake-to-fire interval may differ for differing devices. A shake-to-fire interval may be within a range from about 0 seconds to about 30 seconds. In some instances, a shake-to-fire interval may be equal to, or greater than about 0 seconds (e.g., immediate actuation after shaking), about 1 second, about 2 seconds, about 3 seconds, about 4 seconds, about 5 seconds, about 6 seconds, about 7 seconds, about 8 seconds, about 9 seconds, about 10 seconds, about 11 seconds, about 12 seconds, about 13 seconds, about 14 seconds, about 15 seconds, about 20 seconds, about 25 seconds, about 30 seconds, about 40 seconds, about 50 seconds, or about 60 seconds.

The term "shake orientation" as used herein may refer to an angular range that the device undergoes during shaking. For example, if the device or canister is shaken not in an up and down or side to side motion, but in an angular motion, a shake orientation for the device may be relevant. In some instances, the shake orientation may refer to a desired angular range that the device should undergo during shaking. In some instances, the shake orientation may refer to a desired shake orientation of the device, e.g., as determined during a shake study. A desired shake orientation may differ for different formulations of drugs (e.g., comprising different active ingredients and/or excipients). In some instances, a desired shake orientation may differ for differing devices. A shake orientation may be within a range from about 0 to about 359 degrees. In some instances, a shake orientation may be equal to about, or greater than about 0 degrees, about 10 degrees, about 20 degrees, about 30 degrees, about 40 degrees, about 50 degrees, about 60 degrees, about 70 degrees, about 80 degrees, about 90 degrees, about 100 degrees, about 110 degrees, about 120 degrees, about 130 degrees, about 140 degrees, about 150 degrees, about 160 degrees, about 170 degrees, about 180 degrees, about 190 degrees, about 200 degrees, about 210 degrees, about 220 degrees, about 230 degrees, about 240 degrees, about 250 degrees, about 260 degrees, about 270 degrees, about 280 degrees, about 290 degrees, about 300 degrees, about 310 degrees, about 320 degrees, about 330 degrees, about 340 degrees, about 350 degrees, or about 360 degrees.

In some cases, the actuator may be configured to determine one or more shake parameters for an inhaler or a drug delivery device based on a type of inhaler or drug delivery device. In other cases, the actuator may be configured to determine one or more shake parameters based on a user input.

As described above, the one or more shake parameters may comprise one or more of shake frequency, shake angle, shake duration, shake-to-fire interval, and shake orientation. In some cases, the shake frequency may be about 1.0 Hz to about 4.0 Hz. In some cases, the shake angle may be about 30 degrees to about 180 degrees. In some cases, the shake duration may be about 2 seconds to about 15 seconds. In some cases, the shake-to-fire interval may be about 0 seconds to about 10 seconds. In some cases, the shake orientation may comprise about 0 degrees to about 359 degrees.

The actuator may be configured to actuate the one or more drug delivery devices, after a shaking regimen has been performed, to release an amount of the formulation. In some cases, the formulation released from the inhaler may be emitted as a spray. The spray may contain an emitted dose of a drug. The term "actuate" or "actuation" may refer to the act of compressing a portion of a canister of an inhaler or drug delivery device for a period of time to release a drug or a substance contained within the canister or the holder of the device. Actuation may comprise, for example, automated actuation by a robot device or manual actuation by a human operator.

Actuation of the inhaler or drug delivery device may release a single dose of a formulation contained therein. Proper actuation of the device may be required to release a target dosage of drug from the device. For example, an inhaler or drug delivery device that has been properly shaken according to a prescribed shaking regimen may deliver an unintended dosage of drug if the device is not properly actuated. As such, the apparatus provided herein may be configured to measure and/or monitor actuation of the inhaler or drug delivery device.

Actuating an inhaler or drug delivery device may involve actuating the inhaler or drug delivery device in accordance with one or more actuation parameters. The one or more actuation parameters may include, without limitation, compression velocity, compression acceleration, actuation hold time, decompression velocity, decompression acceleration, actuation stroke length, and any combination thereof. In some cases, measuring or monitoring actuation of an inhaler or nasal device may involve measuring or monitoring one or more actuation parameters.

"Compression velocity" as used herein may refer to the speed with which the device is compressed (e.g., the speed with which a user pushes or compresses the canister of the drug delivery device during actuation). Compression velocity may be from about 10 mm/s to about 100 mm/s. For example, compression velocity may be about 10 mm/s, about 15 mm/s, about 20 mm/s, about 25 mm/s, about 30 mm/s, about 35 mm/s, about 40 mm/s, about 45 mm/s, about 50 mm/s, about 55 mm/s, about 60 mm/s, about 65 mm/s, about 70 mm/s, about 75 mm/s, about 80 mm/s, about 85 mm/s, about 90 mm/s, about 95 mm/s, about 100 mm/s, or greater than about 100 mm/s.

"Compression acceleration" as used herein may refer to the rate of change in velocity per unit time of the canister during compression. Compression acceleration may be from about 500 mm/s$^2$ to about 4000 mm/s$^2$. For example, compression acceleration may be about 500 mm/s$^2$, about 600 mm/s$^2$, about 700 mm/s$^2$, about 800 mm/s$^2$, about 900 mm/s$^2$, about 1000 mm/s$^2$, about 1100 mm/s$^2$, about 1200 mm/s$^2$, about 1300 mm/s$^2$, about 1400 mm/s$^2$, about 1500 mm/s$^2$, about 1600 mm/s$^2$, about 1700 mm/s$^2$, about 1800 mm/s$^2$, about 1900 mm/s$^2$, about 2000 mm/s$^2$, about 2100 mm/s$^2$, about 2200 mm/s$^2$, about 2300 mm/s$^2$, about 2400 mm/s$^2$, about 2500 mm/s$^2$, about 2600 mm/s$^2$, about 2700 mm/s$^2$, about 2800 mm/s$^2$, about 2900 mm/s$^2$, about 3000 mm/s$^2$, about 3100 mm/s$^2$, about 3200 mm/s$^2$, about 3300 mm/s$^2$, about 3400 mm/s$^2$, about 3500 mm/s$^2$, about 3600 mm/s$^2$, about 3700 mm/s$^2$, about 3800 mm/s$^2$, about 3900 mm/s$^2$, about 4000 mm/s$^2$, or greater than about 4000 mm/s$^2$.

"Actuation hold time" as used herein may refer to the amount of time a device is held in its fully actuated state. "Fully actuated" may refer to maximal compression of the canister of an inhaler or drug delivery device. Actuation of a device may include compression of a device and may include an "actuation hold time window", for example, a period of time in which a device is held in its fully actuated state. An actuation hold time window may be from about 0 seconds to about 30 seconds. For example, an actuation hold time window may be about 0 seconds (immediate release), about 1 second, about 2 seconds, about 3 seconds, about 4 seconds, about 5 seconds, about 6 seconds, about 7 seconds, about 8 seconds, about 9 seconds, about 10 seconds, about 11 seconds, about 12 seconds, about 13 seconds, about 14 seconds, about 15 seconds, about 16 seconds, about 17 seconds, about 18 seconds, about 19 seconds, about 20 seconds, about 21 seconds, about 22 seconds, about 23 seconds, about 24 seconds, about 25 seconds, about 26 seconds, about 27 seconds, about 28 seconds, about 29 seconds, about 30 seconds, or greater than about 30 seconds.

"Decompression velocity" as used herein may refer to the speed with which the device is decompressed (e.g., speed with which a user releases or decompresses the canister of the drug delivery device or inhaler after actuation). Decompression velocity may be from about 10 mm/s to about 100 mm/s. For example, decompression velocity may be about 10 mm/s, about 15 mm/s, about 20 mm/s, about 25 mm/s, about 30 mm/s, about 35 mm/s, about 40 mm/s, about 45 mm/s, about 50 mm/s, about 55 mm/s, about 60 mm/s, about 65 mm/s, about 70 mm/s, about 75 mm/s, about 80 mm/s, about 85 mm/s, about 90 mm/s, about 95 mm/s, about 100 mm/s, or greater than about 100 mm/s.

"Decompression acceleration" as used herein may refer to the rate of change of velocity per unit time during decompression of the canister of the drug delivery device during decompression. Decompression acceleration may be from about 500 mm/s$^2$ to about 4000 mm/s$^2$. For example, decompression acceleration may be about 500 mm/s$^2$, about 600 mm/s$^2$, about 700 mm/s$^2$, about 800 mm/s$^2$, about 900 mm/s$^2$, about 1000 mm/s$^2$, about 1100 mm/s$^2$, about 1200 mm/s$^2$, about 1300 mm/s$^2$, about 1400 mm/s$^2$, about 1500 mm/s$^2$, about 1600 mm/s$^2$, about 1700 mm/s$^2$, about 1800 mm/s$^2$, about 1900 mm/s$^2$, about 2000 mm/s$^2$, about 2100 mm/s$^2$, about 2200 mm/s$^2$, about 2300 mm/s$^2$, about 2400 mm/s$^2$, about 2500 mm/s$^2$, about 2600 mm/s$^2$, about 2700 mm/s$^2$, about 2800 mm/s$^2$, about 2900 mm/s$^2$, about 3000 mm/s$^2$, about 3100 mm/s$^2$, about 3200 mm/s$^2$, about 3300 mm/s$^2$, about 3400 mm/s$^2$, about 3500 mm/s$^2$, about 3600 mm/s$^2$, about 3700 mm/s$^2$, about 3800 mm/s$^2$, about 3900 mm/s$^2$, about 4000 mm/s$^2$, or greater than about 4000 mm/s$^2$.

"Actuation stroke length" as used herein may refer to the maximum amount the device is compressed during actuation. In some cases, the actuation stroke length is the mechanical compression limit for the device. Actuation stroke length may be from about 3 mm to about 20 mm. For example, actuation stroke length may be about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, or greater than about 20 mm.

In some cases, the actuator may be configured to determine one or more actuation parameters for an inhaler or a drug delivery device based on a type of inhaler or drug delivery device. In other cases, the actuator may be configured to determine one or more actuation parameters based on a user input. The user input may comprise one or more settings for force, velocity, acceleration, length of stroke, and/or other relevant actuation parameters.

In some cases, the actuator may be configured to actuate the inhaler or device according to a pre-determined actuation profile. The actuation profile may include, for example, actuation velocity, actuation acceleration, initial actuation delay, actuation hold time, post-actuation delay, and/or a predetermined number of iterative actuations, among others. In some cases, one unique actuation profile may be used for the upstroke (e.g., from quiescent position to fully-actuated position) and another unique actuation profile for the downstroke (e.g., from the fully-actuated position to the quiescent position). In some cases, the apparatus may comprise a controller that is configured to measure and record a plurality of pump stroke statistics, including, but not limited to, distance required to achieve maximum velocity, distance at maximum velocity, distance required to stop from maximum velocity, time required to achieve maximum velocity, time spent while at maximum velocity, time required to stop from maximum velocity, time required to reach the fully-actuated position, total time required for overall actuation, among others.

In some embodiments, the actuator may be configured to adjust the one or more shake parameters or the one or more actuation parameters based on a user input. In other embodiments, the actuator may be configured to adjust the one or more shake parameters or the one or more actuation parameters based on a manufacturer of the inhaler or drug delivery device, a type of drug or substance that is contained in the inhaler or drug delivery device, a number of doses remaining in the inhaler or drug delivery device, a previous set of shake parameters used to shake the inhaler or drug delivery device, a previous set of actuation parameters used to actuate the inhaler or drug delivery device, or a number of times the inhaler or drug delivery device has been used.

In some cases, the actuator may be configured to monitor the one or more shake parameters and/or the one or more actuation parameters and to adjust such parameters when the one or more parameters reach or exceed a predetermined threshold. In some cases, the predetermined threshold may be based at least in part on a composition of the drug formulation.

In some cases, the first conduit may comprise a pressure sensor. The pressure sensor may be configured to obtain one or more pressure measurements for different portions of the first conduit. The pressure sensor may be a differential pressure sensor.

In some cases, the first conduit may comprise a flow regulation valve that is configured to regulate the flow rate of a fluid through the first conduit. The flow regulation valve may comprise a control valve, a gate valve, a check valve, a ball valve, a globe valve, a butterfly valve, a diaphragm valve, a needle valve, a pinch valve, a proportional valve, or a stepping motor valve. In some cases, the flow regulation valve may comprise a triple offset butterfly valve or a proportional valve. Each conduit may comprise a separate and independently controllable flow regulation valve.

In some cases, the first conduit may comprise a pressure sensor and a flow regulation valve that is configured to regulate the flow rate of a fluid through the first conduit.

In some embodiments, the second conduit may comprise a pressure sensor. The pressure sensor may be configured to obtain one or more pressure measurements for different portions of the second conduit. The pressure sensor may be a differential pressure sensor. In some cases, the second conduit may comprise a flow regulation valve that is configured to regulate the flow rate of a fluid through the second conduit. In some cases, the second conduit may comprise a pressure sensor and a flow regulation valve that is configured to regulate the flow rate of a fluid through the second conduit. The flow regulation valve may comprise a control valve, a gate valve, a check valve, a ball valve, a globe valve, a butterfly valve, a diaphragm valve, a needle valve, a pinch valve, a proportional valve, or a stepping motor valve. In some cases, the flow regulation valve comprises a triple offset butterfly valve or a proportional valve.

In some cases, at least one or both of the first conduit or the second conduit may comprise at least one, two, or three of a laminar flow conditioner, a flow tube, or a flow verifier. The laminar flow conditioner may comprise a device that is configured to adjust a flow profile of one or more doses or aerosolized particles flowing through the first conduit or the second conduit. The laminar flow conditioner may be configured to reduce one or more disturbances in a flow through the first conduit or the second conduit. The laminar flow conditioner may be configured to maintain a laminar flow through the first conduit or the second conduit. Laminar flow may correspond to a fluid flow that is characterized by a plurality of infinitesimal parallel layers with no disruptions (e.g., eddies, swirls, or currents normal to the flow itself) between the parallel layers. The laminar flow may be characterized by momentum diffusion and minimal momentum convection such that viscous forces associated with the fluid flow are higher than inertial forces associated with the fluid flow. The flow conditioner may be configured to eliminate swirls, non-symmetry of a flow profile, and/or produce pseudo fully developed flow. The flow conditioner may comprise one or more folded vanes, tubes, fins, or orifices that are configured to adjust a flow profile. The flow tube may comprise a tube through which one or more doses or aerosolized particles may flow. The tube may comprise a plurality of portions with different cross-sectional dimensions to adjust a flow path of one or more doses or aerosolized particles. The tube may comprise a plurality of bends to adjust a pressure drop through the flow tube. The flow tube may comprise a plurality of features (e.g., vanes, fins, grooves, protrusions, etc.) to adjust a flow profile associated with a flow of one or more doses or aerosolized particles through the flow tube. The flow verifier may be configured to obtain one or more measurements corresponding to a flow rate or a mass flow rate of one or more doses or aerosolized particles through the first conduit or the second conduit. In some cases, the flow verifier may be configured to provide the one or more measurements to a mass flow controller that is configured to adjust an operation of the breathing simulator. For example, the mass flow controller may be configured to adjust an amount of negative pressure induced by the breathing simulator, a frequency of the breathing simulator, and/or a timing associated with one or more breaths simulated using the breathing simulator.

In some cases, the apparatus may comprise an electric motor that is operatively coupled to the flow regulation valve of the first conduit and/or the second conduit. The electric motor may be configured to control the flow regulation valve. The electric motor may be configured to control a position, an orientation, a wafer angle, and/or a movement of the flow regulation valve.

The electric motor may be configured to control the flow regulation valve of the first conduit and/or the second conduit based on at least one measurement obtained from a pressure sensor and/or a flow sensor. In some cases, the at least one measurement may comprise a real time pressure measurement for one or more regions in the first conduit and/or the second conduit. In some cases, the at least one measurement may comprise a real time flow rate measurement of the one or more doses or one or more particles through the first conduit and/or the second conduit.

In some cases, the apparatus may further comprise a controller that is configured to provide at least one command to the electric motor to incrementally open and close the flow regulation valve to a predetermined position, orientation, or angle. The at least one command may be generated in part based on (i) a user input corresponding to a desired pressure drop across the first conduit and/or (ii) the one or more measurements obtained from the first pressure sensor.

In any of the embodiments described herein, the electric motor may be configured to receive a power input from an external power source and a control input from the system controller, and may produce a rotary drive output dependent on the power and control inputs. In one embodiment, the rotary drive output may consist of a cylindrical shaft rotating about an axis of rotation, and may be instantaneously characterized by an angular position, an angular velocity, an angular acceleration and a torque. The rotary drive output may include rotation in either direction (e.g., clockwise or counterclockwise). The rotary drive output may be configured to control a position, an orientation, an angle, and/or a movement of one or more flow regulation valves.

The apparatus may comprise a movable platform. The movable platform may comprise an adapter unit that is configured to secure or attach the inhaler or drug delivery device to a portion of the movable platform. The adapter unit may be configured to fix a position and/or an orientation of the inhaler or drug delivery device relative to the movable platform. In some cases, the adapter unit may comprise an attachment unit. The attachment unit may comprise a hook, a clamp, a latch, a holder, a band, and/or a strap.

In some cases, the movable platform may be configured to move relative to the one or more conduits of the apparatus or one or more inlets of the one or more conduits. The movable platform may be configured to adjust a position and/or an orientation of the inhaler or drug delivery device relative to the one or more conduits or the one or more inlets of the one or more conduits.

The movable platform may be configured to move along an XY plane. The XY plane may be parallel to a longitudinal axis of the one or more conduits. The XY plane may be orthogonal to a mating plane that corresponds to a position and/or an orientation of the one or more inlets of the one or more conduits. The movable platform may be configured to move along a Z-axis that is perpendicular to the XY plane.

The movable platform may be operatively coupled to a motor assembly comprising one or more drive motors. The one or more drive motors may be configured to move the movable platform forward, backwards, or sideways relative to the one or more conduits or the one or more inlets of the one or more conduits. In some cases, the motor assembly may comprise one or more voltage or current drive amplifier(s) configured to control the one or more drive motor(s).

In some embodiments, the apparatus may further comprise a mating plane sensor. The mating plane sensor may be configured to obtain positioning information for the movable platform. The positioning information may correspond to a position or an orientation of the movable platform or the inhaler relative to the first input port or the second input port.

The mating plane sensor may be configured to detect a position of the one or more input ports. The mating plane sensor may be configured to detect when the inhaler is aligned with the one or more input ports. The mating plane sensor may be configured to detect an offset between the position and/or orientation of the inhaler and the position and/or orientation of the input ports. The mating plane sensor may be configured to provide positioning information associated with the inhaler, the movable platform, and/or the one or more input ports to a controller to adjust a position, orientation, motion, or movement path of the movable plate relative to the one or more input ports. The mating plane sensor and the controller may operate as part of a closed loop control system.

In some embodiments, the apparatus may comprise a controller that is configured to receive a plurality of inputs and adjust the position or the orientation of the movable platform based at least in part on the plurality of inputs. The plurality of inputs may comprise (i) the positioning information associated with the movable platform and (ii) a user input corresponding to a selection of a desired input port.

In some cases, the movable platform may be configured to mate the inhaler to at least one of the first inlet port, the second inlet port, or a third inlet port in response to a user input corresponding to a selection of a desired input port.

In some cases, the first inlet port and the second inlet port may comprise a mating ring that is configured to releasably couple to the inhaler to create a seal. The mating ring may be sufficiently designed to form a seal between the conduits and the mouthpiece of an MDI, pMDI, DPI, or similar device mouthpiece. In some cases, the inhaler may comprise a mating ring that is fitted to a portion of the inhaler and/or the conduit interfaces. In such cases, the mating ring may be configured to create a seal between the inhaler and the first inlet port, the second inlet port, or a third inlet port. The mating ring may comprise a soft and compliant material that is configured to create a reliable seal. The material may comprise, for example, soft silicone rubber.

FIG. 1A illustrates an exemplary apparatus 100 for inhaler testing. The apparatus 100 may comprise one or more dose collector modules 110. The one or more dose collector modules 110 may comprise a dose unit sampling apparatus (DUSA), a cascade impactor, an optical spray or aerosol analyzer, and/or a waste collector. The apparatus 100 may comprise a dose collection flow chamber 120. The dose collection flow chamber 120 may comprise a manifold. The dose collection flow chamber 120 may be in fluid communication with a vacuum source 130. The apparatus 100 may comprise an actuator 140. The actuator 140 may be a Vereo SFMDx automated actuator. The actuator 140 may be configured to shake and/or actuate an inhaler 145 for testing. The apparatus 100 may comprise a movable platform 150 comprising an automated stage that is configured to move in an X-axis direction, a Y-axis direction, and/or a Z-axis direction relative to the one or more dose collector modules 110 to mate an inhaler 145 with the one or more dose collector modules 110. In some cases, the automated stage may be configured to rotate about an XY plane, an XZ plane, and/or a YZ plane to align an inhaler 145 with the one or more dose collector modules 110.

FIG. 1B illustrates another exemplary apparatus 100 for inhaler testing. The apparatus 100 may comprise one or more dose collector modules 110. The one or more dose collector modules 110 may comprise a dose unit sampling apparatus (DUSA), a cascade impactor, an optical spray or aerosol analyzer, and/or a waste collector. The apparatus 100 may comprise a dose collection flow chamber 120. The dose collection flow chamber 120 may comprise a manifold. The dose collection flow chamber 120 may be in fluid communication with a vacuum source 130. The apparatus 100 may comprise an actuator 140. The actuator 140 may be a Vereo SFMDx automated actuator. The actuator 140 may be configured to shake and/or actuate an inhaler 145 for testing. The apparatus 100 may comprise a movable platform 150 comprising an automated stage that is configured to move in an X-axis direction and/or a Y-axis direction relative to the one or more dose collector modules 110 to mate an inhaler 145 with the one or more dose collector modules 110.

FIG. 2 illustrates an exemplary apparatus 200 for inhaler testing. The apparatus 200 may comprise a first conduit 210 with a first port or inlet 310. The first conduit 210 may comprise a first fluid flow path 211 through the first conduit 210. The apparatus 200 may comprise a second conduit 220 with a second port or inlet 320. The second conduit 220 may comprise a second fluid flow path 221 through the second conduit 220.

The apparatus 200 may comprise a first dose collector module 410. The first dose collector module 410 may comprise a quick disconnect cartridge. The quick disconnect cartridge may comprise a waster, a DUSA, a flow tube, and/or a flow verifier.

The first conduit 210 may comprise a quick disconnect mating inlet 411. The first conduit 210 may comprise a laminar flow conditioner 412 and/or a laminar flow sensor. The first conduit 210 may comprise a flow regulation valve 413. The flow regulation valve 413 may comprise a triple offset butterfly valve, a proportional valve, or a stepping motor valve.

The apparatus 200 may comprise a second dose collector module 420. The second dose collector module 420 may comprise a quick disconnect cartridge. The quick disconnect cartridge may comprise a waster, a DUSA, a flow tube, and/or a flow verifier.

The second conduit 220 may comprise a quick disconnect mating inlet 421. The second conduit 220 may comprise a laminar flow conditioner 422 and/or a laminar flow sensor. The second conduit 220 may comprise a flow regulation valve 423. The flow regulation valve 423 may comprise a triple offset butterfly valve, a proportional valve, or a stepping motor valve.

In some embodiments, the apparatus may comprise a manifold 430. The manifold 430 may be configured to converge at least the first conduit 210 and the second conduit 220 into an outlet conduit. The outlet conduit may be in fluid communication with a vacuum source 440. The vacuum source 440 may comprise a breathing simulator as described elsewhere herein.

Each conduit may comprise an inlet or a port. For example, the first conduit 210 may comprise a first inlet 310 and the second conduit 220 may comprise a second inlet 320. A mating ring 401 may be provided at or near the inlets 310 and 320. In some cases, the apparatus 200 may comprise a third conduit with a third fluid flow path 231. The third conduit may comprise a third inlet 330. In some cases, a throat collar 402 may be provided at the third inlet 330.

In some cases, the apparatus 200 may comprise three or more conduits. In some cases, the apparatus 200 may comprise a third conduit. In some cases, the third conduit may comprise a USP (United States Pharmacopeia) inlet throat 460. The third conduit may be in fluid communication with a cascade impactor 470. The cascade impactor 470 may be in fluid communication with a flow tube 480.

The apparatus 200 may comprise an automated stage that is configured to move a drug delivery device 600 and adjust the position and/or orientation of the drug delivery device 600 relative to the one or more inlet ports 310, 320, and 330. The drug delivery device 600 may comprise an inhaler. The automated stage may comprise a movable platform as described elsewhere herein. The automated stage may be configured to move along a port selection axis 510 and/or a mate axis 520. The port selection axis 510 may span the one or more inlet ports 310, 320, and 330. The automated stage may be configured to move along the port selection axis 510 to align the drug delivery device 600 with the one or more inlets ports 310, 320, and/or 330, depending on a user selection or a particular conduit designated for testing the particular drug delivery device 600. Once a desired inlet port is selected or designated, the automated stage may be configured to move along the mate axis 520 to mate the drug delivery device 600 with the one or more inlets ports 310, 320, and/or 330. In some cases, the drug delivery device 600 may comprise another mating ring 401 that is configured to mate with the inlets 310, 320, and 330, a mating ring 401 of the inlets, or a throat collar 402 of the inlets. In some cases, the automated stage may be configured to move the drug delivery device 600 to align a portion of the drug delivery device 600 with a mating plane 530 that corresponds to a position and/or an orientation of the inlets 310, 320, and 330. In some cases, the automated stage may be configured to adjust a position and/or an orientation of the drug delivery device 600 based on one or more positional measurements obtained using a mating plane detection sensor 540. The mating plane detection sensor 540 may be configured to detect a position of the one or more input ports. The mating plane detection sensor 540 may be configured to detect when the inhaler 600 is aligned with the one or more input ports 310, 320, and 330. The mating plane detection sensor 540 may be configured to detect an offset between the position and/or orientation of the inhaler 600 and the position and/or orientation of the input ports 310, 320, and 330. The mating plane detection sensor 540 may be configured to provide positioning information associated with the inhaler 600, the movable platform, and/or the one or more input ports 310, 320, and 330 to a controller to adjust a position, orientation, motion, or movement path of the movable plate relative to the one or more input ports 310, 320, and 330. The mating plane detection sensor 540 and the controller may operate as part of a closed loop control system.

In any of the embodiments described herein, one or more components of the dose collection apparatus may comprise an inert material. The inert material may comprise a material that does not react with the sample dose. In an embodiment, the inert material may comprise a plastic. In an embodiment, the inert material may comprise polypropylene. In an embodiment, the inert material may comprise a glass.

In another aspect, the present disclosure provides a method for inhaler testing. The method may comprise providing an apparatus for inhaler testing. The apparatus may comprise (a) a first conduit comprising a first inlet port and a first fluid flow path; (b) a second conduit comprising a second inlet port and a second fluid flow path; (c) a movable platform configured to mate an inhaler to at least one of the first inlet port or the second inlet port; and (d) an actuator configured to operate the inhaler to provide a dose to at least one of the first conduit or the second conduit. The first fluid flow path may be in fluid communication with the first inlet port and a first dose collector module. The second fluid flow path may be in fluid communication with the second inlet port and a second dose collector module. The dose provided by the inhaler may comprise a sample dose or a waste dose. In some cases, the apparatus may comprise a third conduit comprising a third inlet port and a third fluid flow path. The method may further comprise using the actuator to shake the inhaler. The method may further comprise using the movable platform to adjust a position and/or an orientation of the inhaler relative to the first inlet port, the second inlet port, or the third inlet port to mate the inhaler to at least one of the first inlet port, the second inlet port, or the third inlet port, in response to a user input corresponding to a selection of a desired input port. The method may further comprise using the actuator to actuate the inhaler to provide one or more doses to the selected or desired inlet port for testing.

Computer Systems

Figure 3:
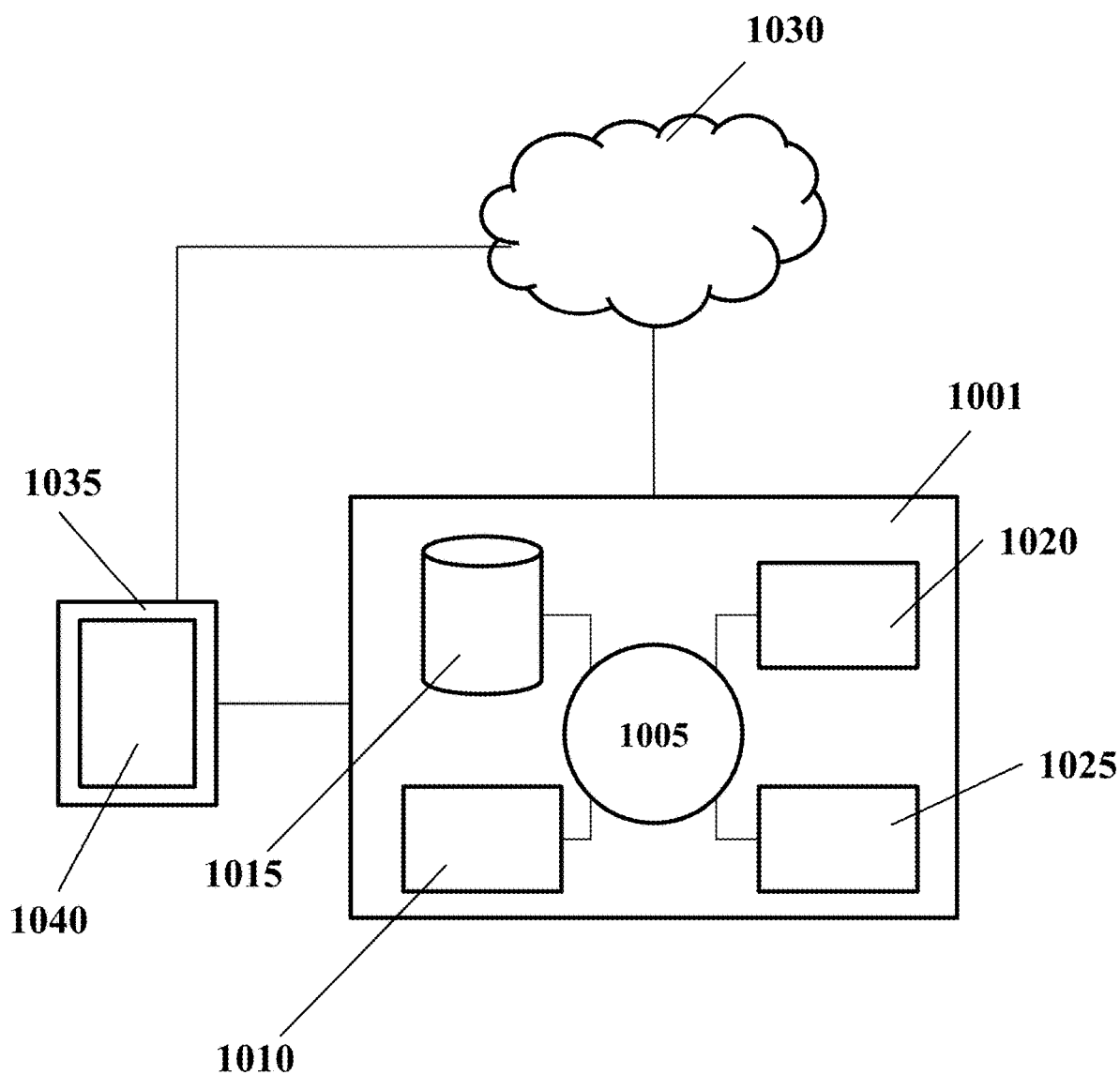
FIG. 3 schematically illustrates a computer system that is programmed or otherwise configured to implement methods described herein.

In an aspect, the present disclosure provides computer systems that are programmed or otherwise configured to implement methods of the disclosure, e.g., any of the subject methods for drug delivery device testing. FIG. 3 shows a computer system 1001 that is programmed or otherwise configured to implement a method for drug delivery device testing. The computer system 1001 may be configured to, for example, control an operation of one or more components of a dose collection apparatus. The computer system 1001 may be configured to control an actuator to shake a drug delivery device. The computer system 1001 may be configured to control the movable platform to adjust a position and/or an orientation of the drug delivery device relative to the first inlet port, the second inlet port, or the third inlet port to mate the drug delivery device to at least one of the first inlet port, the second inlet port, or the third inlet port, in response to a user input corresponding to a selection of a desired input port. The computer system 1001 may be configured to control the actuator to actuate the drug delivery device to provide one or more sample or waste doses to the selected or desired inlet port for testing. The computer system 1001 can be an electronic device of a user or a computer system that is remotely located with respect to the electronic device. The electronic device can be a mobile electronic device.

The computer system 1001 may include a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are located external to the computer system 1001 (e.g., on a remote server that is in communication with the computer system 1001 through an intranet or the Internet).

The computer system 1001 can communicate with one or more remote computer systems through the network 1030. For instance, the computer system 1001 can communicate with a remote computer system of a user (e.g., a drug delivery device manufacturer, a drug delivery device tester, a consumer, a healthcare provider, a patient, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, a portal for a user to monitor or track testing of one or more drug delivery devices. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm may be configured to control an actuator of the dose collection apparatus to shake the inhaler in accordance with one or more shake parameters. The algorithm may be further configured to control a movable platform to adjust a position and/or an orientation of an inhaler relative to a first inlet port, a second inlet port, or a third inlet port of the dose collection apparatus to mate the inhaler to at least one of the first inlet port, the second inlet port, or the third inlet port, in response to a user input corresponding to a selection of a desired input port. The algorithm may be further configured to control the actuator to actuate the inhaler in accordance with one or more actuation parameters to provide one or more sample or waste doses to the selected or desired inlet port for testing.

Non-Limiting List of Exemplary Embodiments

In addition to the aspects and embodiments described and provided elsewhere in this disclosure, the following non-limiting list of particular embodiments are specifically contemplated.

1. A dose collection apparatus comprising:
    (a) a first conduit comprising a first inlet port and a first fluid flow path, wherein the first fluid flow path is in fluid communication with the first inlet port and a first dose collector module;
    (b) a second conduit comprising a second inlet port and a second fluid flow path, wherein the second fluid flow path is in fluid communication with the second inlet port and a second dose collector module;
    (c) a movable platform configured to mate an inhaler to at least one of the first inlet port or the second inlet port; and
    (d) an actuator configured to operate the inhaler to provide a dose to at least one of the first conduit or the second conduit, wherein the dose comprises a sample dose or a waste dose.
2. The apparatus of embodiment 1, wherein the first dose collector module is a dose unit sampling apparatus (DUSA).
3. The apparatus of embodiment 1, wherein the first dose collector module comprises a low resistance filter configured to capture the dose provided by the inhaler.
4. The apparatus of embodiment 3, wherein the low resistance filter is configured to retain aerosolized particles with a particle size ranging from about 0.1 micrometers (μm) to about 10 μm.
5. The apparatus of embodiment 3, wherein the low resistance filter has a flow resistance of about 150 Pascals at a flow rate of about 90 liters of air per minute.
6. The apparatus of embodiment 1, wherein the first dose collector module is a cascade impactor.
7. The apparatus of embodiment 1, wherein the first dose collector module is an optical spray or an aerosol analyzer.
8. The apparatus of any preceding embodiment, wherein the second dose collector module is a waste collector.
9. The apparatus of any preceding embodiment, wherein the first inlet port is located at one end of the first conduit, and wherein the first dose collector module is located at the opposite end of the first conduit.
10. The apparatus of any preceding embodiment, wherein the second inlet port is located at one end of the second conduit, and wherein the second dose collector module is located at the opposite end of the second conduit.
11. The apparatus of any preceding embodiment, wherein the apparatus comprises a manifold that is configured to converge the first conduit and the second conduit into an outlet conduit, wherein the outlet conduit comprises an outlet port that is in fluid communication with a vacuum source.
12. The apparatus of any preceding embodiment, wherein at most one of the first conduit and the second conduit is operational at a given time instance.
13. The apparatus of embodiment 11, wherein the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation.
14. The apparatus of embodiment 13, wherein the breathing simulator is configured to induce the flow through at most one of the first conduit and the second conduit at a given time instance.
15. The apparatus of embodiment 13, wherein the breathing simulator is configured to generate a user programmable output trigger signal.
16. The apparatus of embodiment 15, wherein the output trigger signal is programmed to trigger at a user specified time that is within a time period required for the breathing simulator to execute a breathing profile.
17. The apparatus of any preceding embodiment, wherein the actuator is configured to (i) shake the inhaler and/or (ii) actuate the inhaler to provide the dose to at least one of the first conduit and the second conduit.
18. The apparatus of embodiment 17, wherein the actuator is configured to receive the output trigger signal described in any previous claim.
19. The apparatus of embodiment 18, wherein the actuator is configured to actuate the device upon receipt of the output trigger signal described in any previous claim.
20. The apparatus of any preceding embodiment, wherein the first conduit comprises a pressure sensor.
21. The apparatus of embodiment 20, wherein the pressure sensor is a differential pressure sensor.
22. The apparatus of any preceding embodiment, wherein the first conduit comprises a flow regulation valve that is configured to regulate the flow rate of a fluid through the first conduit.
23. The apparatus of any preceding embodiment, wherein the apparatus comprises a plurality of flow regulation valves that are configured to independently control or regulate flow through each of a plurality of conduits, wherein the plurality of conduits comprises at least the first conduit and the second conduit.
24. The apparatus of any preceding embodiment, wherein the first conduit comprises a pressure sensor and a flow regulation valve that is configured to regulate the flow rate of a fluid through the first conduit.
25. The apparatus of embodiment 22, further comprising an electric motor that is operatively coupled to the flow regulation valve, wherein the electric motor is configured to control the flow regulation valve.
26. The apparatus of embodiment 22, wherein the flow regulation valve comprises a control valve, a gate valve, a check valve, a ball valve, a globe valve, a butterfly valve, a diaphragm valve, a needle valve, a pinch valve, a proportional valve, or a stepping motor valve.

27. The apparatus of embodiment 22, further comprising an electric motor that is operatively coupled to the flow regulation valve, wherein the electric motor is configured to control the flow regulation valve based on at least one measurement obtained from the pressure sensor.

28. The apparatus of embodiment 27, wherein the pressure sensor comprises a differential pressure sensor, and wherein the at least one measurement comprises a real time flow rate measurement through the first conduit.

29. The apparatus of any one of embodiments 22-28, wherein the flow regulation valve comprises a triple offset butterfly valve or a proportional valve.

30. The apparatus of any one of embodiments 25-28, further comprising a controller that is configured to provide at least one command to the electric motor to incrementally open and close the flow regulation valve to a predetermined position or orientation.

31. The apparatus of embodiment 30, wherein the at least one command is generated in part based on (i) a user input corresponding to a desired pressure drop across the first conduit and (ii) the one or more measurements obtained from the first pressure sensor.

32. The apparatus of any preceding embodiment, wherein the second conduit comprises a pressure sensor.

33. The apparatus of embodiment 32, wherein the pressure sensor is a differential pressure sensor.

34. The apparatus of any preceding embodiment, wherein the second conduit comprises a flow regulation valve that is configured to regulate the flow rate of a fluid through the second conduit.

35. The apparatus of any preceding embodiment, wherein the second conduit comprises a pressure sensor and a flow regulation valve that is configured to regulate the flow rate of a fluid through the second conduit.

36. The apparatus of embodiment 34, further comprising an electric motor that is operatively coupled to the flow regulation valve, wherein the electric motor is configured to control the flow regulation valve.

37. The apparatus of embodiment 34, further comprising an electric motor that is operatively coupled to the flow regulation valve, wherein the electric motor is configured to control the flow regulation valve based on at least one measurement obtained from the pressure sensor.

38. The apparatus of embodiment 37, wherein the pressure sensor comprises a differential pressure sensor, and wherein the at least one measurement comprises a real time flow rate measurement through the second conduit.

39. The apparatus of any one of embodiments 34-38, wherein the flow regulation valve comprises a triple offset butterfly valve or a proportional valve.

40. The apparatus of any one of embodiments 36-38, further comprising a controller that is configured to provide at least one command to the electric motor to incrementally open and close the flow regulation valve to a predetermined position or orientation.

41. The apparatus of embodiment 40, wherein the at least one command is generated in part based on (i) a user input corresponding to a desired pressure drop across the first conduit and (ii) the one or more measurements obtained from the first pressure sensor.

42. The apparatus of any preceding embodiment, further comprising a controller.

43. The apparatus of any preceding embodiment, further comprising a mating plane sensor configured to obtain positioning information for the movable platform, wherein the positioning information corresponds to a position or an orientation of the movable platform or the inhaler relative to the first input port or the second input port.

44. The apparatus of embodiment 43, wherein the mating plane sensor is configured to detect a position of the first input port or the second input port relative to the movable platform.

45. The apparatus of embodiment 43, wherein the mating plane sensor is configured to detect when the inhaler is aligned with the first input port or the second input port.

46. The apparatus of embodiment 43, wherein the mating plane sensor is configured to detect an offset between a position or an orientation of the inhaler and a position or an orientation of the first input port or the second input port.

47. The apparatus of embodiment 43, wherein the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port.

48. The apparatus of embodiment 43, further comprising a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port.

49. The apparatus of any preceding embodiment, wherein the first inlet port and the second inlet port comprise a mating ring that is configured to releasably couple to the inhaler to create a seal.

50. The apparatus of any preceding embodiment, wherein the inhaler comprises a mating ring that is fitted to a portion of the inhaler.

51. The apparatus of embodiment 49 or 50, wherein the mating ring is configured to create a seal between the inhaler and the first inlet port or the second inlet port when the inhaler is positioned adjacent to the first inlet port or the second inlet port.

52. The apparatus of embodiment 49 or 50, wherein the mating ring comprises a soft silicone rubber or a soft compliant material that is configured to create a reliable seal between the inhaler and the first inlet port or the second inlet port.

53. The apparatus of any preceding embodiment, wherein at least one or both of the first conduit or the second conduit comprises at least one, two, or three of a laminar flow conditioner, a flow tube, or a flow verifier.

54. The apparatus of any preceding embodiment, further comprising a third conduit comprising a third inlet port and a third fluid flow path, wherein the third fluid flow path is in fluid communication with the third inlet port.

55. The apparatus of embodiment 54, wherein the movable platform is configured to mate the inhaler to at least one of the first inlet port, the second inlet port, or the third inlet port in response to a user input corresponding to a selection of a desired input port.

56. The apparatus of embodiment 53, wherein the flow verifier is configured to obtain one or more measurements corresponding to a flow rate or a mass flow rate through the first conduit or the second conduit.

57. The apparatus of embodiment 53, wherein the flow verifier is configured to provide the one or more measurements to a mass flow controller that is configured to adjust an operation of the breathing simulator.

58. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose, wherein the first dose collector module comprises a low resistance filter configured to capture the dose provided by the inhaler.

59. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose, wherein the first dose collector module is an optical spray or an aerosol analyzer.

60. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose, wherein the apparatus comprises a manifold that is configured to converge the first conduit and the second conduit into an outlet conduit, wherein the outlet conduit comprises an outlet port that is in fluid communication with a vacuum source.

61. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose, wherein the first conduit and/or second conduit comprises a pressure sensor.

62. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose, wherein the apparatus comprises a plurality of flow regulation valves that are configured to independently control or regulate flow through each of a plurality of conduits, wherein the plurality of conduits comprises at least the first conduit and the second conduit.

63. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port;
   (d) an actuator configured to operate the inhaler to provide a dose to at least one of the first conduit or the second conduit, wherein the dose comprises a sample dose or a waste dose; and
   (e) a mating plane sensor configured to obtain positioning information for the movable platform, wherein the positioning information corresponds to a position or an orientation of the movable platform or the inhaler relative to the first input port or the second input port.

64. A dose collection apparatus comprising:
   (a) a first conduit comprising a first inlet port and a first fluid flow path, wherein the first fluid flow path is in fluid communication with the first inlet port and a first dose collector module;

(b) a second conduit comprising a second inlet port and a second fluid flow path, wherein the second fluid flow path is in fluid communication with the second inlet port and a second dose collector module;

(c) a movable platform configured to mate an inhaler to at least one of the first inlet port or the second inlet port; and (d) an actuator configured to operate the inhaler to provide a dose to at least one of the first conduit or the second conduit, wherein the dose comprises a sample dose or a waste dose, wherein at least one or both of the first conduit or the second conduit comprises at least one, two, or three of a laminar flow conditioner, a flow tube, or a flow verifier.

65. The apparatus of any one of embodiments 58-64, wherein the first dose collector module is a dose unit sampling apparatus (DUSA).

66. The apparatus of any one of embodiments 58-65, wherein the first dose collector module comprises a low resistance filter configured to capture the dose provided by the inhaler.

67. The apparatus of embodiment 66, wherein the low resistance filter is configured to retain aerosolized particles with a particle size ranging from about 0.1 micrometers (μm) to about 10 μm.

68. The apparatus of embodiment 66, wherein the low resistance filter has a flow resistance of about 150 Pascals at a flow rate of about 90 liters of air per minute.

69. The apparatus of any one of embodiments 58-68, wherein the first dose collector module is a cascade impactor.

70. The apparatus of any one of embodiments 58-69, wherein the first dose collector module is an optical spray or an aerosol analyzer.

71. The apparatus of any one of embodiments 58-70, wherein the second dose collector module is a waste collector.

72. The apparatus of any one of embodiments 58-71, wherein the first inlet port is located at one end of the first conduit, and wherein the first dose collector module is located at the opposite end of the first conduit.

73. The apparatus of any one of embodiments 58-72, wherein the second inlet port is located at one end of the second conduit, and wherein the second dose collector module is located at the opposite end of the second conduit.

74. The apparatus of any one of embodiments 58-73, wherein the apparatus comprises a manifold that is configured to converge the first conduit and the second conduit into an outlet conduit, wherein the outlet conduit comprises an outlet port that is in fluid communication with a vacuum source.

75. The apparatus of any one of embodiments 58-74, wherein at most one of the first conduit and the second conduit is operational at a given time instance.

76. The apparatus of embodiment 74, wherein the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation.

77. The apparatus of embodiment 76, wherein the breathing simulator is configured to induce the flow through at most one of the first conduit and the second conduit at a given time instance.

78. The apparatus of embodiment 76, wherein the breathing simulator is configured to generate a user programmable output trigger signal.

79. The apparatus of embodiment 78, wherein the output trigger signal is programmed to trigger at a user specified time that is within a time period required for the breathing simulator to execute a breathing profile.

80. The apparatus of any one of embodiments 58-79, wherein the actuator is configured to (i) shake the inhaler and/or (ii) actuate the inhaler to provide the dose to at least one of the first conduit and the second conduit.

81. The apparatus of embodiment 80, wherein the actuator is configured to receive the output trigger signal described in any previous claim.

82. The apparatus of embodiment 81, wherein the actuator is configured to actuate the device upon receipt of the output trigger signal described in any previous claim.

83. The apparatus of any one of embodiments 58-82, wherein the first conduit comprises a pressure sensor.

84. The apparatus of embodiment 83, wherein the pressure sensor is a differential pressure sensor.

85. The apparatus of any one of embodiments 58-84, wherein the first conduit comprises a flow regulation valve that is configured to regulate the flow rate of a fluid through the first conduit.

86. The apparatus of any one of embodiments 58-85, wherein the apparatus comprises a plurality of flow regulation valves that are configured to independently control or regulate flow through each of a plurality of conduits, wherein the plurality of conduits comprises at least the first conduit and the second conduit.

87. The apparatus of any one of embodiments 58-86, wherein the first conduit comprises a pressure sensor and a flow regulation valve that is configured to regulate the flow rate of a fluid through the first conduit.

88. The apparatus of embodiment 85, further comprising an electric motor that is operatively coupled to the flow regulation valve, wherein the electric motor is configured to control the flow regulation valve.

89. The apparatus of embodiment 85, wherein the flow regulation valve comprises a control valve, a gate valve, a check valve, a ball valve, a globe valve, a butterfly valve, a diaphragm valve, a needle valve, a pinch valve, a proportional valve, or a stepping motor valve.

90. The apparatus of embodiment 85, further comprising an electric motor that is operatively coupled to the flow regulation valve, wherein the electric motor is configured to control the flow regulation valve based on at least one measurement obtained from the pressure sensor.

91. The apparatus of embodiment 90, wherein the pressure sensor comprises a differential pressure sensor, and wherein the at least one measurement comprises a real time flow rate measurement through the first conduit.

92. The apparatus of any one of embodiments 85-91, wherein the flow regulation valve comprises a triple offset butterfly valve or a proportional valve.

93. The apparatus of any one of embodiments 88-91, further comprising a controller that is configured to provide at least one command to the electric motor to incrementally open and close the flow regulation valve to a predetermined position or orientation.

94. The apparatus of embodiment 93, wherein the at least one command is generated in part based on (i) a user input corresponding to a desired pressure drop across the first conduit and (ii) the one or more measurements obtained from the first pressure sensor.

95. The apparatus of any one of embodiments 58-94, wherein the second conduit comprises a pressure sensor.

96. The apparatus of embodiment 95, wherein the pressure sensor is a differential pressure sensor.

97. The apparatus of any one of embodiments 58-96, wherein the second conduit comprises a flow regulation valve that is configured to regulate the flow rate of a fluid through the second conduit.

98. The apparatus of any one of embodiments 58-97, wherein the second conduit comprises a pressure sensor and a flow regulation valve that is configured to regulate the flow rate of a fluid through the second conduit.

99. The apparatus of embodiment 97, further comprising an electric motor that is operatively coupled to the flow regulation valve, wherein the electric motor is configured to control the flow regulation valve.

100. The apparatus of embodiment 97, further comprising an electric motor that is operatively coupled to the flow regulation valve, wherein the electric motor is configured to control the flow regulation valve based on at least one measurement obtained from the pressure sensor.

101. The apparatus of embodiment 100, wherein the pressure sensor comprises a differential pressure sensor, and wherein the at least one measurement comprises a real time flow rate measurement through the second conduit.

102. The apparatus of any one of embodiments 97-101, wherein the flow regulation valve comprises a triple offset butterfly valve or a proportional valve.

103. The apparatus of any one of embodiment 99-101, further comprising a controller that is configured to provide at least one command to the electric motor to incrementally open and close the flow regulation valve to a predetermined position or orientation.

104. The apparatus of embodiment 103, wherein the at least one command is generated in part based on (i) a user input corresponding to a desired pressure drop across the first conduit and (ii) the one or more measurements obtained from the first pressure sensor.

105. The apparatus of any one of embodiments 58-104, further comprising a controller.

106. The apparatus of any one of embodiments 58-105, further comprising a mating plane sensor configured to obtain positioning information for the movable platform, wherein the positioning information corresponds to a position or an orientation of the movable platform or the inhaler relative to the first input port or the second input port.

107. The apparatus of embodiment 106, wherein the mating plane sensor is configured to detect a position of the first input port or the second input port relative to the movable platform.

108. The apparatus of embodiment 106, wherein the mating plane sensor is configured to detect when the inhaler is aligned with the first input port or the second input port.

109. The apparatus of embodiment 106, wherein the mating plane sensor is configured to detect an offset between a position or an orientation of the inhaler and a position or an orientation of the first input port or the second input port.

110. The apparatus of embodiment 106, wherein the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port.

111. The apparatus of embodiment 106, further comprising a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port.

112. The apparatus of any one of embodiments 58-111, wherein the first inlet port and the second inlet port comprise a mating ring that is configured to releasably couple to the inhaler to create a seal.

113. The apparatus of any one of embodiments 58-112, wherein the inhaler comprises a mating ring that is fitted to a portion of the inhaler.

114. The apparatus of embodiment 112 or 113, wherein the mating ring is configured to create a seal between the inhaler and the first inlet port or the second inlet port when the inhaler is positioned adjacent to the first inlet port or the second inlet port.

115. The apparatus of embodiment 112 or 113, wherein the mating ring comprises a soft silicone rubber or a soft compliant material that is configured to create a reliable seal between the inhaler and the first inlet port or the second inlet port.

116. The apparatus of any one of embodiments 58-115, wherein at least one or both of the first conduit or the second conduit comprises at least one, two, or three of a laminar flow conditioner, a flow tube, or a flow verifier.

117. The apparatus of any one of embodiments 58-116, further comprising a third conduit comprising a third inlet port and a third fluid flow path, wherein the third fluid flow path is in fluid communication with the third inlet port.

118. The apparatus of embodiment 117, wherein the movable platform is configured to mate the inhaler to at least one of the first inlet port, the second inlet port, or the third inlet port in response to a user input corresponding to a selection of a desired input port.

119. The apparatus of embodiment 116, wherein the flow verifier is configured to obtain one or more measurements corresponding to a flow rate or a mass flow rate through the first conduit or the second conduit.

120. The apparatus of embodiment 116, wherein the flow verifier is configured to provide the one or more measurements to a mass flow controller that is configured to adjust an operation of the breathing simulator.

121. A dose collection apparatus comprising:
  (a) a first conduit comprising a first inlet port and a first fluid flow path, wherein the first fluid flow path is in fluid communication with the first inlet port and a first dose collector module;
  (b) a second conduit comprising a second inlet port and a second fluid flow path, wherein the second fluid flow path is in fluid communication with the second inlet port and a second dose collector module;
(c) a movable platform configured to mate an inhaler to at least one of the first inlet port or the second inlet port; and
(d) an actuator configured to operate the inhaler to provide a dose to at least one of the first conduit or the second conduit, wherein the dose comprises a sample dose or a waste dose, wherein the first conduit and/or the second conduit comprises a flow regulation valve that is configured to regulate the flow rate of a fluid through the first conduit and/or the second conduit, and wherein the flow regulation valve is a proportional valve.

122. A dose collection apparatus comprising:
(a) a first conduit comprising a first inlet port and a first fluid flow path, wherein the first fluid flow path is in fluid communication with the first inlet port and a first dose collector module;
(b) a second conduit comprising a second inlet port and a second fluid flow path, wherein the second fluid flow path is in fluid communication with the second inlet port and a second dose collector module;
(c) a movable platform configured to mate an inhaler to at least one of the first inlet port or the second inlet port; and
(d) an actuator configured to operate the inhaler to provide a dose to at least one of the first conduit or the second conduit, wherein the dose comprises a sample dose or a waste dose, wherein the inhaler comprises a mating ring that is fitted to a portion of the inhaler.

123. The apparatus of embodiment 121 or 122, wherein the first dose collector module is a dose unit sampling apparatus (DUSA).

124. The apparatus of embodiment 121 or 122, wherein the first dose collector module comprises a low resistance filter configured to capture the dose provided by the inhaler.

125. The apparatus of embodiment 124, wherein the low resistance filter is configured to retain aerosolized particles with a particle size ranging from about 0.1 micrometers (μm) to about 10 μm.

126. The apparatus of embodiment 124, wherein the low resistance filter has a flow resistance of about 150 Pascals at a flow rate of about 90 liters of air per minute.

127. The apparatus of embodiment 121 or 122, wherein the first dose collector module is a cascade impactor.

128. The apparatus of embodiment 121 or 122, wherein the first dose collector module is an optical spray or an aerosol analyzer.

129. The apparatus of any one of embodiments 121-128, wherein the second dose collector module is a waste collector.

130. The apparatus of any one of embodiments 121-129, wherein the first inlet port is located at one end of the first conduit, and wherein the first dose collector module is located at the opposite end of the first conduit.

131. The apparatus of any one of embodiments 121-130, wherein the second inlet port is located at one end of the second conduit, and wherein the second dose collector module is located at the opposite end of the second conduit.

132. The apparatus of any one of embodiments 121-131, wherein the apparatus comprises a manifold that is configured to converge the first conduit and the second conduit into an outlet conduit, wherein the outlet conduit comprises an outlet port that is in fluid communication with a vacuum source.

133. The apparatus of any one of embodiments 121-132, wherein at most one of the first conduit and the second conduit is operational at a given time instance.

134. The apparatus of embodiment 132, wherein the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation.

135. The apparatus of embodiment 134, wherein the breathing simulator is configured to induce the flow through at most one of the first conduit and the second conduit at a given time instance.

136. The apparatus of embodiment 134, wherein the breathing simulator is configured to generate a user programmable output trigger signal.

137. The apparatus of embodiment 136, wherein the output trigger signal is programmed to trigger at a user specified time that is within a time period required for the breathing simulator to execute a breathing profile.

138. The apparatus of any one of embodiments 121-137, wherein the actuator is configured to (i) shake the inhaler and/or (ii) actuate the inhaler to provide the dose to at least one of the first conduit and the second conduit.

139. The apparatus of embodiment 138, wherein the actuator is configured to receive the output trigger signal described in any previous claim.

140. The apparatus of embodiment 139, wherein the actuator is configured to actuate the device upon receipt of the output trigger signal described in any previous claim.

141. The apparatus of any one of embodiments 121-140, wherein the first conduit comprises a pressure sensor.

142. The apparatus of embodiment 141, wherein the pressure sensor is a differential pressure sensor.

143. The apparatus of any one of embodiments 121-142, wherein the first conduit comprises a flow regulation valve that is configured to regulate the flow rate of a fluid through the first conduit.

144. The apparatus of any one of embodiments 121-143, wherein the apparatus comprises a plurality of flow regulation valves that are configured to independently control or regulate flow through each of a plurality of conduits, wherein the plurality of conduits comprises at least the first conduit and the second conduit.

145. The apparatus of any one of embodiments 121-144, wherein the first conduit comprises a pressure sensor and a flow regulation valve that is configured to regulate the flow rate of a fluid through the first conduit.

146. The apparatus of embodiment 143, further comprising an electric motor that is operatively coupled to the flow regulation valve, wherein the electric motor is configured to control the flow regulation valve.

147. The apparatus of embodiment 143, wherein the flow regulation valve comprises a control valve, a gate valve, a check valve, a ball valve, a globe valve, a butterfly valve, a diaphragm valve, a needle valve, a pinch valve, a proportional valve, or a stepping motor valve.

148. The apparatus of embodiment 143, further comprising an electric motor that is operatively coupled to the flow regulation valve, wherein the electric motor is configured to control the flow regulation valve based on at least one measurement obtained from the pressure sensor.

149. The apparatus of embodiment 148, wherein the pressure sensor comprises a differential pressure sensor, and wherein the at least one measurement comprises a real time flow rate measurement through the first conduit.

150. The apparatus of any one of embodiments 143-149, wherein the flow regulation valve comprises a triple offset butterfly valve or a proportional valve.

151. The apparatus of any one of embodiments 146-149, further comprising a controller that is configured to provide at least one command to the electric motor to incrementally open and close the flow regulation valve to a predetermined position or orientation.

152. The apparatus of embodiment 151, wherein the at least one command is generated in part based on (i) a user input corresponding to a desired pressure drop across the first conduit and (ii) the one or more measurements obtained from the first pressure sensor.

153. The apparatus of any one of embodiments 121-152, wherein the second conduit comprises a pressure sensor.

154. The apparatus of embodiment 153, wherein the pressure sensor is a differential pressure sensor.

155. The apparatus of any one of embodiments 121-154, wherein the second conduit comprises a flow regulation valve that is configured to regulate the flow rate of a fluid through the second conduit.

156. The apparatus of any one of embodiments 121-155, wherein the second conduit comprises a pressure sensor and a flow regulation valve that is configured to regulate the flow rate of a fluid through the second conduit.

157. The apparatus of embodiment 155, further comprising an electric motor that is operatively coupled to the flow regulation valve, wherein the electric motor is configured to control the flow regulation valve.

158. The apparatus of embodiment 155, further comprising an electric motor that is operatively coupled to the flow regulation valve, wherein the electric motor is configured to control the flow regulation valve based on at least one measurement obtained from the pressure sensor.

159. The apparatus of embodiment 158, wherein the pressure sensor comprises a differential pressure sensor, and wherein the at least one measurement comprises a real time flow rate measurement through the second conduit.

160. The apparatus of any one of embodiments 155-159, wherein the flow regulation valve comprises a triple offset butterfly valve or a proportional valve.

161. The apparatus of any one of embodiment 157-159, further comprising a controller that is configured to provide at least one command to the electric motor to incrementally open and close the flow regulation valve to a predetermined position or orientation.

162. The apparatus of embodiment 161, wherein the at least one command is generated in part based on (i) a user input corresponding to a desired pressure drop across the first conduit and (ii) the one or more measurements obtained from the first pressure sensor.

163. The apparatus of any one of embodiments 121-162, further comprising a controller.

164. The apparatus of any one of embodiments 121-163, further comprising a mating plane sensor configured to obtain positioning information for the movable platform, wherein the positioning information corresponds to a position or an orientation of the movable platform or the inhaler relative to the first input port or the second input port.

165. The apparatus of embodiment 164, wherein the mating plane sensor is configured to detect a position of the first input port or the second input port relative to the movable platform.

166. The apparatus of embodiment 164, wherein the mating plane sensor is configured to detect when the inhaler is aligned with the first input port or the second input port.

167. The apparatus of embodiment 164, wherein the mating plane sensor is configured to detect an offset between a position or an orientation of the inhaler and a position or an orientation of the first input port or the second input port.

168. The apparatus of embodiment 164, wherein the mating plane sensor is configured to (i) obtain positioning information associated with at least one of the inhaler, the movable platform, or the first input port and the second input port, and (ii) provide the positioning information to a controller to adjust a position, an orientation, a motion, or a movement path of the movable plate relative to the first input port or the second input port.

169. The apparatus of embodiment 164, further comprising a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port.

170. The apparatus of any one of embodiments 121-169, wherein the first inlet port and the second inlet port comprise a mating ring that is configured to releasably couple to the inhaler to create a seal.

171. The apparatus of any one of embodiments 121-170, wherein the inhaler comprises a mating ring that is fitted to a portion of the inhaler.

172. The apparatus of embodiment 170 or 171, wherein the mating ring is configured to create a seal between the inhaler and the first inlet port or the second inlet port when the inhaler is positioned adjacent to the first inlet port or the second inlet port.

173. The apparatus of embodiment 170 or 171, wherein the mating ring comprises a soft silicone rubber or a soft compliant material that is configured to create a reliable seal between the inhaler and the first inlet port or the second inlet port.

174. The apparatus of any one of embodiments 121-173, wherein at least one or both of the first conduit or the second conduit comprises at least one, two, or three of a laminar flow conditioner, a flow tube, or a flow verifier.

175. The apparatus of any one of embodiments 121-174, further comprising a third conduit comprising a third inlet port and a third fluid flow path, wherein the third fluid flow path is in fluid communication with the third inlet port.

176. The apparatus of embodiment 175, wherein the movable platform is configured to mate the inhaler to at least one of the first inlet port, the second inlet port, or the third inlet port in response to a user input corresponding to a selection of a desired input port.

177. The apparatus of embodiment 174, wherein the flow verifier is configured to obtain one or more measurements corresponding to a flow rate or a mass flow rate through the first conduit or the second conduit.

178. The apparatus of embodiment 174 wherein the flow verifier is configured to provide the one or more measurements to a mass flow controller that is configured to adjust an operation of the breathing simulator.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A dose collection apparatus comprising:
   (a) a first conduit comprising a first inlet port and a first fluid flow path, wherein the first fluid flow path is in fluid communication with the first inlet port and a first dose collector module;
   (b) a second conduit comprising a second inlet port and a second fluid flow path, wherein the second fluid flow path is in fluid communication with the second inlet port and a second dose collector module;
   (c) a movable platform configured to mate an inhaler to at least one of the first inlet port or the second inlet port; and
   (d) an actuator configured to operate the inhaler to provide a dose to at least one of the first conduit or the second conduit, wherein the dose comprises a sample dose or a waste dose.

2. The apparatus of claim 1, wherein the first dose collector module is a dose unit sampling apparatus (DUSA).

3. The apparatus of claim 1, wherein the first dose collector module comprises a low resistance filter configured to capture the dose provided by the inhaler.

4. The apparatus of claim 1, wherein the first dose collector module is a cascade impactor, an optical spray, or an aerosol analyzer.

5. The apparatus of claim 1, wherein the second dose collector module is a waste collector.

6. The apparatus of claim 1, wherein the first inlet port is located at one end of the first conduit, and wherein the first dose collector module is located at the opposite end of the first conduit; wherein the second inlet port is located at one end of the second conduit, and wherein the second dose collector module is located at the opposite end of the second conduit; or both.

7. The apparatus of claim 1, wherein the apparatus comprises a manifold that is configured to converge the first conduit and the second conduit into an outlet conduit, wherein the outlet conduit comprises an outlet port that is in fluid communication with a vacuum source.

8. The apparatus of claim 7, wherein the vacuum source comprises a breathing simulator that is configured to induce a flow (i) from one end of the first or second conduit to the opposite end of the respective first or second conduit to simulate inhalation, and (ii) in a reverse direction from the opposite end to the one end to simulate exhalation.

9. The apparatus of claim 8, wherein the breathing simulator is configured to induce the flow through at most one of the first conduit and the second conduit at a given time instance.

10. The apparatus of claim 8, wherein the breathing simulator is configured to generate a user programmable output trigger signal.

11. The apparatus of claim 1, wherein at most one of the first conduit and the second conduit is operational at a given time instance.

12. The apparatus of claim 1, wherein the actuator is configured to (i) shake the inhaler and/or (ii) actuate the inhaler to provide the dose to at least one of the first conduit and the second conduit.

13. The apparatus of claim 1, wherein the first conduit, the second conduit, or both, comprises a pressure sensor.

14. The apparatus of claim 1, wherein the first conduit comprises a flow regulation valve that is configured to regulate the flow rate of a fluid through the first conduit; the second conduit comprises a flow regulation valve that is configured to regulate the flow rate of a fluid through the second conduit; or both.

15. The apparatus of claim 14, further comprising an electric motor that is operatively coupled to the flow regulation valve, wherein the electric motor is configured to control the flow regulation valve.

16. The apparatus of claim 15, further comprising a controller that is configured to provide at least one command to the electric motor to incrementally open and close the flow regulation valve to a predetermined position or orientation.

17. The apparatus of claim 1, further comprising a mating plane sensor configured to obtain positioning information for the movable platform, wherein the positioning information corresponds to a position or an orientation of the movable platform or the inhaler relative to the first input port or the second input port.

18. The apparatus of claim 17, wherein the mating plane sensor is configured to:
   (i) detect a position of the first input port or the second input port relative to the movable platform;
   (ii) detect when the inhaler is aligned with the first input port or the second input port;
   iii) detect an offset between a position or an orientation of the inhaler and a position or an orientation of the first input port or the second input port;
   (iv) obtain positioning information associated with at least one of the inhaler, the movable platform, or the first input port and the second input port; and provide the positioning information to a controller to adjust a position, an orientation, a motion, or a movement path of the movable platform relative to the first input port or the second input port; or
   (v) any combination thereof.

19. The apparatus of claim 17, further comprising a controller that is configured to receive a plurality of inputs from the mating plane sensor and adjust the position or the orientation of the movable platform based at least in part on the plurality of inputs, which plurality of inputs comprises (i) the positioning information for the movable platform and (ii) a user input corresponding to a selection of a desired input port.

20. A method for inhaler testing, the method comprising:
(a) providing or obtaining an apparatus according to claim 1;
(b) shaking the inhaler with the actuator;
(c) adjusting a position, an orientation, or both, of the inhaler relative to the first inlet port or the second inlet port to mate the inhaler to at least one of the first inhaler port or the second inhaler port; and
(d) actuating the inhaler with the actuator to provide one or more doses of the inhaler to the first inlet port or the second inlet port for testing.

* * * * *